(12) United States Patent
Makino et al.

(10) Patent No.: US 7,776,503 B2
(45) Date of Patent: Aug. 17, 2010

(54) PARTICLES AND MANUFACTURING METHOD THEREOF, TONER AND MANUFACTURING METHOD THEREOF, AND DEVELOPER, TONER CONTAINER, PROCESS CARTRIDGE, IMAGE FORMING METHOD AND IMAGE FORMING APPARATUS

(75) Inventors: Nobuyasu Makino, Numazu (JP);
Masakazu Nakada, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 525 days.

(21) Appl. No.: 11/385,994

(22) Filed: Mar. 22, 2006

(65) Prior Publication Data
US 2006/0222980 A1    Oct. 5, 2006

(30) Foreign Application Priority Data
Mar. 31, 2005   (JP)  ............................... 2005-101140

(51) Int. Cl.
*G03G 9/08* (2006.01)
(52) U.S. Cl. ....................................... 430/137.1; 264/9
(58) Field of Classification Search ................ 264/9; 430/137.1
See application file for complete search history.

(56) References Cited
U.S. PATENT DOCUMENTS

| | | | |
|---|---|---|---|
| 3,326,467 | A | 6/1967 | Fortman |
| 4,575,325 | A | 3/1986 | Duerig et al. |
| 5,024,695 | A | 6/1991 | Ashdown et al. |
| 6,162,377 | A * | 12/2000 | Ghosh et al. ................... 264/9 |
| 6,355,390 | B1 | 3/2002 | Yamanami et al. |
| 2005/0112492 | A1 | 5/2005 | Makino et al. |

FOREIGN PATENT DOCUMENTS

| | | |
|---|---|---|
| EP | 0 833 230 A2 | 4/1998 |
| GB | 2 397 541 A | 7/2004 |
| JP | 57108860 A * | 7/1982 |
| JP | 1-182856 | 7/1989 |
| JP | 2625576 | 4/1997 |
| JP | 9-146299 | 6/1997 |
| JP | 10-263380 | 10/1998 |
| JP | 2000-19775 | 1/2000 |

(Continued)

OTHER PUBLICATIONS

English language translation of JP 2004-276016 (Oct. 2004).*

(Continued)

*Primary Examiner*—Christopher RoDee
(74) *Attorney, Agent, or Firm*—Oblon, Spivak, McClelland, Maier & Neustadt, L.L.P.

(57) ABSTRACT

The present invention provides a method for manufacturing particles, where a viscous material is sprayed with a high-pressure gas for atomization while the viscous material is being discharged in a chamber, and cooling air is introduced in the chamber for granulation. The present invention also provides a method for manufacturing a toner, where a mixture containing at least a binding resin and a colorant is melt mixed under pressure or melt mixed with an injection of a supercritical fluid, the obtained melt-mixed substance is sprayed with a high-pressure gas for atomization while the melt-mixed substance is being discharged in a chamber, and cooling air is introduced in the chamber from an air inlet formed on the chamber.

38 Claims, 14 Drawing Sheets

FOREIGN PATENT DOCUMENTS

| | | |
|---|---|---|
| JP | 2000-52340 | 2/2000 |
| JP | 2000-52341 | 2/2000 |
| JP | 2000-52342 | 2/2000 |
| JP | 2001-312098 | 11/2001 |
| JP | 2003-10666 | 1/2003 |
| JP | 2004-31927 | 1/2004 |
| JP | 2004-249206 | 9/2004 |
| JP | 2004-276016 | 10/2004 |
| JP | 2004276016 A * | 10/2004 |
| JP | 2005-258394 | 9/2005 |
| WO | WO 92/17533 | 10/1992 |
| WO | WO 02/089998 A1 | 11/2002 |
| WO | WO 2005/058507 A1 | 6/2005 |

OTHER PUBLICATIONS

U.S. Appl. No. 11/752,562, filed May 23, 2007, Kubota, et al.

* cited by examiner

PARTICLES AND MANUFACTURING METHOD THEREOF, TONER AND MANUFACTURING METHOD THEREOF, AND DEVELOPER, TONER CONTAINER, PROCESS CARTRIDGE, IMAGE FORMING METHOD AND IMAGE FORMING APPARATUS

BACKGROUND OF THE INVENTION

1. Field of the Invention

The present invention relates to: particles by spray granulation or spray granulation with a supercritical fluid and a manufacturing method of the particles; a toner and the manufacturing method of the toner; and a developer, a toner container, a process cartridge, an image forming method and an image forming apparatus using the toner.

2. Description of the Related Art

The recent electrophotography has observed an increase in printouts of a photograph-based graphic document in addition to printouts of a text-based document owing to the digitalization and the developments of network and computers. Also, an image by electrophotography has been required further improvement in terms of image quality, and as a means thereof a toner has been further refined for particle size reduction.

As a manufacturing process for such toner, a so-called pulverization method is mainly employed, which includes a series of processes: heating and melt mixing followed by pulverization for atomization of multiple materials containing, for example, (1) a mixture containing at least a binding resin, a colorant and a charge controller, (2) a mixture containing at least a binding resin, a colorant, a charge controller and a wax, or (3) a mixture containing at least a binding resin, a colorant, a charge controller, a wax and a magnetizing agent. However, this pulverization method has low energy efficiency with increased energy consumption on pulverization. Also, this pulverization method increases the generation rate of fine particles, producing angular toner particles and hence reducing the average toner sphericity. Therefore, it causes problems such as reduction in flowability, refillability and fine-dot reproducibility. In order to resolve the latter problem and improve the quality, a classification process is added after pulverization for a sharp particle size distribution, but this causes a problem of low product yield.

Moreover, the image quality obtained by the recent electrophotographic method has improved such that it is close to that obtained by silver halide photography. A toner having a particle size of 5 μm to 6 μm with narrow distribution is becoming predominant, and a toner with such particle size has been in practical use by means of a chemical process of liquid-phase granulation, for example, a polymerized toner. However, the manufacture of this polymerized toner produces less carbon dioxide but consumes a large quantity of water compared to the conventional pulverization method (melt mixing process, pulverization process, classification process, mixing process and sieving process), and it has a problem in terms of environment consciousness and cost in water treatment. Also, it requires a large-scale plant in terms of facilities, and the cost reduction is impossible without mass production; therefore, there is another problem of growing initial cost.

To solve such problems, there are methods to improve the heat-transfer efficiency and granulation yield by means of spray granulation, especially a spray granulation method of injecting and spraying a supercritical fluid, which has never been proposed in the area of electrophotographic toner manufacturing technology.

For example, the following has been proposed for manufacturing a resin powder: (1) a technology related to a manufacturing apparatus which is equipped with an ultrasonic gas atomization nozzle for spraying a fluid medium International Publication No. WO 02/089998 (Novel Technical Solutions Ltd.); (2) a technology employing a spray granulation nozzle for manufacturing a metallic powder by atomization of molten metal with a gas jet for which the frequency of ultrasonic vibration is adjusted U.S. Pat. No. 4,575,325; (3) a technology for manufacturing a powder having holes of metal or metal alloy by dissolving a gas m a molten metal followed by atomization of the molten metal having the dissolved gas by means of compressed air U.S. Pat. No. 5,024,695; and (4) a sonic spray nozzle for nebulization of a fluid U.S. Pat. No. 3,326,467.

These spray granulation technologies, however, are aimed at producing particles constituted by a single material instead of materials of multiple kinds such as electrophotographic toner. Therefore, they can neither be applied directly to the production of an electrophotographic toner nor resolve the problems regarding the manufacture of a particle toner, especially the problems of the productivity and the energy consumption.

In addition, Japanese Patent Application Laid-Open (JP-A) Nos. 01-182856, 09-146299 and 2000-19775 propose a technology for improving the pulverization efficiency in the subsequent process. In the proposed technology, a chemical foaming agent is introduced in melt mixing of a mixture of multiple materials constituting a toner, or a binding resin to which a chemical foaming agent has already been internally added and dispersed is used. The mixture is heated to generate a carbon dioxide gas or a nitrogen gas for foaming the binding resin, and crack boundaries are formed by the internal bubbles, which improves the pulverization efficiency in the subsequent process. Examples of the chemical foaming agents employed in the method which employs a chemical foaming agent includes: an organic substance including a bicarbonate of alkali metals such as sodium bicarbonate and potassium bicarbonate; a bicarbonate of heavy metals such as mercury bicarbonate and cadmium bicarbonate and ammonium carbonate; and an organic substance such as azide compounds, azodicarbonamide, diaminobenzene, Freon 11 and Freon 12. However, these chemical foaming agents include hazardous substances in handling or substances which may trigger environmental pollution. Also, the heating required for the chemical forming agent to foam thermally stresses the low-temperature fixing toner, which is gaining an attention recently. The characteristics of the chemical foaming agent itself adversely affect the toner characteristics such as physical properties, fixing property and charge property.

Although it is not related to a toner, JP-A No. 2003-10666 proposes a bubble formation technology by injecting and dispersing carbon dioxide gas in the melt-mixing process for internal foaming as a technology to foam a binding resin for generation of a foaming body and reduction of discoloration and carbonization due to thermal degradation in the melt mixing process of a thermoplastic resin. The application of this technology to a toner production does not adversely affect various toner qualities since an inert gas is used. However, the ratio of foams in the toner resin is about 60% by volume at most because the dispersion of the gas in the melted resin tends to be non-uniform. The expected effect of foaming on the subsequent process is at the farthest up to medium pulverization, and it is not powerful enough for pulverization to the size of 5 µm to 6 µm required as a fine toner product.

Japanese Patent (JP-B) No. 2625576 proposes a technology for manufacturing a foamed material and a foamed plastic having fine bubbles by means of a supercritical fluid. The conventional foaming method with the chemical foaming agent mentioned above enables the weight reduction of the foaming resin but decreases the strength, and the application as a forming member has been restricted. However, Micro Cellular Foaming (MCF) technology developed at MIT in the United Stated and shown in JP-B No. 2625576 enables the production of forming resin in which micro bubbles of 5 µm or less are uniformly formed. Although the ultimate purpose of this technology to foam a single polymer particle and to manufacture foamed materials and foamed products having a small-sized bubbles, the electrophotographic toner includes not only a binding resin but also other materials such as colorant. Since the mixture comprised of multiple materials prepared in the course of toner manufacturing is further pulverized for manufacturing a toner as a final product, it is not possible to apply directly the technology disclosed in JP-B No. 2625576 to the manufacture of an electrophotographic toner. Even though bubbles having a bubble density of $10^9$ bubbles per 1 $cm^3$ of foamed material and an average foam size of 5 µm or less are formed in the mixture, the pulverization property does not significantly improve, and the yield does not improve due to the occurrence of superfine particles during pulverization.

In addition, as a means to prepare a toner with a supercritical fluid, JP-A No. 2001-312098 proposes a method to dissolve a binding resin component in the supercritical region to mix and disperse a colorant component in the supercritical region. In this proposal, toner materials are melt mixed with a supercritical fluid, but the toner is not spray granulated with a high-pressure gas.

JP-A Nos. 2004-276016, 2004-249206, 2000-52342, 2000-52341, 2000-52340 and 10-263380 propose methods for improving the heat-transfer efficiency and product yield other than a toner ensphering method. However, these proposals lack consideration for the control of the incoming air volume or the noise caused by the incoming air, and the toner granulation with mixed or melted materials has not been achieved yet.

SUMMARY OF THE INVENTION

The present invention is aimed at providing: a spray granulation method with a mixed or melted substance containing toner materials in a supercritical state or a method for manufacturing a toner with high heat-transfer efficiency and high productivity by atomizing a melt-mixed substance containing toner materials by means of the spray granulation method; particles and a manufacturing method of the particles which enables the formation of an electrophotographic image having reproducibility of fine lines and tones which are equivalent to those of a silver halide image by means of the aforementioned toner manufacturing methods; a toner and the manufacturing method of the toner; and a developer, a toner container, a process cartridge, an image forming method and an image forming apparatus using the toner.

In the method for manufacturing fine particles of the present invention, a high-pressure gas is sprayed over a viscous material for atomization as the viscous material is being discharged in a chamber, and cooling air is introduced in the chamber for granulation.

Particles of the present invention are manufactured by the above-mentioned manufacturing method of particles of the present invention.

In the first aspect of the toner manufacturing method of the present invention, any one of the following mixtures (1) to (4) is melt mixed under pressure or melt mixed with an injection of a supercritical fluid; then a high-pressure gas is sprayed over the obtained melt-mixed substance for atomization while the melt-mixed mixture is being discharged in a chamber;

and cooling air is introduced for granulation in the chamber through an air inlet formed in the chamber:

(1) a mixture containing at least a binding resin and a colorant;

(2) a mixture containing at least a binding resin, a colorant and a charge controller;

(3) a mixture containing at least a binding resin, a colorant, a charge controller and a wax; or (4) a mixture containing at least a binding resin, a magnetizing agent, a charge controller, a wax and a magnetizing agent.

In the second aspect of the toner manufacturing method of the present invention, by using a spray granulation apparatus which is equipped with a means to melt any one of the following mixtures (1) to (4) under pressure and a chamber with a high-pressure gas nozzle, the mixture is uniformly dispersed while being melt mixed or being melt mixed with an injection of a supercritical fluid under pressure; then a high-pressure gas is sprayed from the high-pressure gas nozzle for atomization while the obtained dispersion is being discharged in the chamber;

and cooling air is introduced through an air inlet formed in the chamber for granulation in the chamber:

(1) a mixture containing at least a binding resin and a colorant;

(2) a mixture containing at least a binding resin, a colorant and a charge controller;

(3) a mixture containing at least a binding resin, a colorant, a charge controller and a wax; or (4) a mixture containing at least a binding resin, a magnetizing agent, a charge controller, a wax and a magnetizing agent.

The toner of the present invention is manufactured by means of the aforementioned toner manufacturing methods of first and second aspects of the present invention.

A developer of the present invention includes the toner of the present invention.

A toner container of the present invention is filled with the toner of the present invention.

A process cartridge includes at least a latent electrostatic image bearing member and a developing means to develop a latent electrostatic image formed on the latent electrostatic image bearing member using the toner of the present invention and to form a visible image.

An image forming apparatus of the present invention includes at least a latent electrostatic image forming means which forms a latent electrostatic image on a latent electrostatic image bearing member, a developing means which forms a visible image by developing the latent electrostatic image using the toner of the present invention, a transferring means which transfers the visible image to a recording medium, and a fixing means which fixes a transfer image transferred to the recording medium.

An image forming method of the present invention includes at least a latent electrostatic image bearing member, a latent electrostatic image forming means which forms a latent electrostatic image on the latent electrostatic image bearing member, a developing means which forms a visible image by developing the latent electrostatic image with the toner of the present invention, a transferring means which fixes a transfer image transferred to the recording medium.

BREIF DESCRIPTION OF THE DRAWINGS

Figure 1:
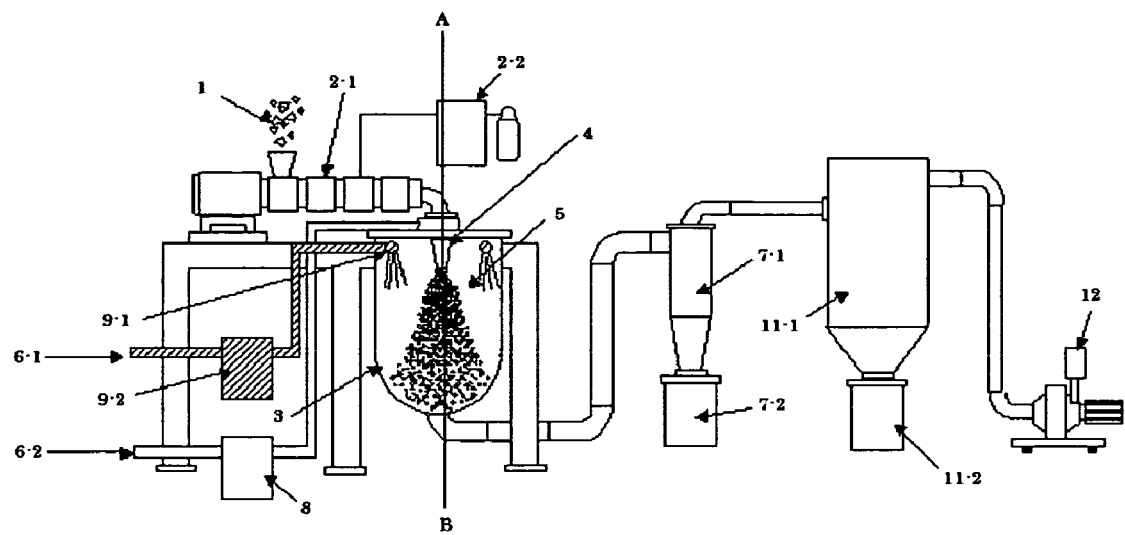
FIG. 1 is a diagram showing an example of a spray granulation process by means of a conventional spray granulation apparatus.

DESCRIPTION OF THE PREFERRED EMBODIMENTS (Particles and Particle Manufacturing Method)

In the method for manufacturing fine particles of the present invention, a high-pressure gas is sprayed over a viscous material while it is being discharged in a chamber for atomization, and cooling air is introduced in the chamber for granulation.

Particles of the present invention are manufactured by the above-mentioned manufacturing method of particles of the present invention.

The details of the particles of the present invention are revealed through the illustration of the method for manufacturing fine particles of the present invention.

The viscous material is preferably any one of a resin-melted material and a resin-dissolved material.

The resin-melted material includes at least a resin, and it further includes other components according to requirements.

The resin-dissolved material includes at least a resin, and it further includes other components according to requirements.

The resin is or not particularly restricted and can be selected according to applications, but a thermoplastic resin is preferable. Examples thereof include a styrene acrylic resin having a melt temperature of 170° C. and a spray pressure of 0.4 MPa, a polyacetal resin having a melt temperature of 170° C. and a spray pressure of 0.4 MPa, an acrylic resin having a melt temperature of 170° C. and a spray pressure of 0.4 MPa, an acrylic cross-linking molded material having a melt temperature of 115° C. and a spray pressure of 0.4 MPa, a cyclic olefin copolymer having a melt temperature of 170° C. and a spray pressure of 0.3 MPa, Nylon 11 having a melt temperature of 275° C. and a spray pressure of 0.4 MPa, a polyester resin having a melt temperature of 200° C. and a spray pressure of 0.5 MPa, a polyethylene resin(having a melt temperature of 220° C. and a spray pressure of 0.5 MPa, a polyethylene wax having a melt temperature of 170° C. and a spray pressure of 0.2 MPa, a polylactide resin having a melt temperature of 230° C. and a spray pressure of 0.4 MPa, a polyvinyl chloride solution having a spray pressure of 0.4 MPa, an epoxy polyester copolymer, a polyamide (Nylon 6 and Nylon 12), a polyolefin resin, a polyolefin wax, a carnauba wax, a polystyrene, an ethylene vinyl acetate copolymer and an ethylene vinyl alcohol copolymer. These may be used alone or in combination of two or more types.

The viscous material is preferably a composite including at least a resin and particles. Examples thereof include a composite material of a styrene acrylic resin and a polyester resin and a composite material of a styrene acrylic resin, a polyester resin and a carnauba wax.

It is preferable that the viscous material is preferable any one of a resin-melted material and a resin-dissolved material, that a mixture obtained after any one of the resin-melted material and the resin-dissolved material is mixed or mixed with an injection of a supercritical fluid under pressure is sprayed with a high-pressure gas for atomization while the mixture is being discharged in a chamber and that cooling air is introduced for granulation in the chamber through an air inlet formed in the chamber.

It is preferable, by using a spray granulation apparatus equipped with a means to melt the viscous material under pressure and a chamber with a high-pressure gas nozzle, that a dispersion obtained by dispersing the viscous material mixed or mixed under pressure with an injection of a supercritical fluid is sprayed with a high-pressure gas nozzle while the dispersion is discharged in a chamber for atomization, and that cooling air is introduced for granulation in the chamber through an air inlet formed in the chamber:

It is preferable that cooling air is introduced for granulation from an air inlet formed at the top or the upper sidewall of the chamber.

The granulation is preferably performed with the condition where the static pressure P inside the chamber satisfies the following relation: −0.01 MPa≦P≦0.01 MPa.

The air inlet is preferably able to form a swirling flow. The air inlet preferably has a gate for adjusting its cross-sectional area. The air inlet is preferably covered with a sound insulating material. Here, the detail of the air inlet is illustrated hereinafter with the toner manufacturing method.

The chamber preferably has a jacket on the outer surface of the chamber for temperature regulation, and the chamber preferably has a heat insulating mechanism divided into multiple segments on the outer surface of the chamber. The chamber preferably has a sound insulating mechanism on the outer surface of the chamber.

It is preferable that a melt mixing takes place while the melt mixing apparatus in which a supercritical fluid is injected and dispersed has an internal temperature which is in the range of −10° C. to +100° C. from the melting point or the initial efflux temperature of the viscous material or +30° C. to +150° C. from the glass transition temperature of the viscous material. It is preferable that an ultrasonic pulse of 10 kHz to 80 kHz is imparted to the high-pressure gas.

Regarding the spray granulation conditions with the viscous material, the temperature of an extruder is controlled such that the minimum temperature is the temperature at which the material has or almost has the lowest viscosity and that the maximum temperature is the safe temperature right before the decomposition starts.

When a polymer melt is used as the viscous material, a polyolefin wax having a very small molecular weight has a temperature of 60° C., and a polyacrylic ketone has a temperature of 370° C.

This temperature range is within the tolerance of the process when a material having a sufficiently low extensional viscosity, which is usually related to branching and molecular weight, is obtained.

Spherical particles have been prepared in practice with various viscous materials at an extruder temperature of 60° C. to 250° C.

Also, the spray pressure may be appropriately adjusted depending on the characteristics of the materials, the required particle size and the final intended purpose.

The process restriction may be appropriately selected depending on, for example, technical limitations, cooling formulations or facilities required by materials; an example thereof is a gas pressure. The reason is that the increasing gas pressure raises the gas velocity and, as a result, decreases the cooling time.

Similarly, materials having a high thermal retention or a long softening curve such as a toner including a polyester resin is in practice restricted in terms of the spray pressure unless some kind of compulsory cooling structure is introduced. In general, the spray pressure is preferably 0.2 MPa to 0.6 MPa (or 2 atm to 6 atm).

In order to use such spray pressure, the viscous material preferably has a minimum melt viscosity of no greater than 50 Pa·s to 100 Pa·s. Also, the viscous material preferably has a molecular weight of no greater than 10 to 50,000.

The high-temperature gas preferably has a temperature of at or above the melt temperature of the viscous material at which the interaction between the gas and liquid occurs (the high-temperature gas may be replaced by an inert gas when a certain material has a problem of degradation due to oxidation). In general though it varies depending on the pressure, an Novel Technical Solution's jet cools the gas temperature by 30° C. to 50° C. due to the compression effect. Therefore, the typical temperature of the supplied gas is 40° C. to 80° C., which is higher than the melt temperature.

The mass average particle diameter of the particles manufactured by the particle manufacturing method of the present invention is preferably 3.0 μM to 10.0 μm, and more preferably 4.0 μm to 7.0 μm.

The ratio of the mass average particle diameter to the number average particle diameter is preferably 1.03 to 1.50, and more preferably 1.06 to 1.28.

The average sphericity is preferably 0.85 to 0.99, and more preferably 0.94 to 0.97.

The content of the fine particles having a particle diameter of 2 μM or less is preferably 15% by number or less, and more preferably 5% by number or less.

Any material may be atomized for the production of resin particles and metal particles, for example, as long as the material can be liquefied. It is especially effective for micronization of a composite material including a resin. Specific examples of the application include: a toner, a cosmetics, ink for an ink-jet printer, a coating material and a ceramic composite (a polymer with dispersed ceramics powder). Among these, the toner described below is particularly preferable.

(Toner and Toner Manufacturing Method)

In the first aspect of the toner manufacturing method of the present invention, any one of the following mixtures (1) to (4) is mixed under pressure or mixed with an injection of a supercritical fluid; then a high-pressure gas is sprayed over the obtained mixture for atomization while the mixture is being discharged in a chamber;

and cooling air is introduced for granulation in the chamber through an air inlet formed in the chamber:

(1) a mixture containing at least a binding resin and a colorant;

(2) a mixture containing at least a binding resin, a colorant and a charge controller;

(3) a mixture containing at least a binding resin, a colorant, a charge controller and a wax; or (4) a mixture containing at least a binding resin, a magnetizing agent, a charge controller, a wax and a magnetizing agent.

In the second aspect of the toner manufacturing method of the present invention, by using a spray granulation apparatus equipped with a means to melt any one of the following mixtures (1) to (4) under pressure and a chamber with a high-pressure gas nozzle, the mixture is uniformly dispersed while being mixed or being mixed with an injection of a supercritical fluid under pressure; then a high-pressure gas is sprayed from the high-pressure gas nozzle for atomization while the obtained dispersion is being discharged in the chamber;

and cooling air is introduced through an air inlet formed in the chamber for granulation in the chamber:

(1) a mixture containing at least a binding resin and a colorant;

(2) a mixture containing at least a binding resin, a colorant and a charge controller;

(3) a mixture containing at least a binding resin, a colorant, a charge controller and a wax; or (4) a mixture containing at least a binding resin, a magnetizing agent, a charge controller, a wax and a magnetizing agent.

The toner of the present invention is manufactured by means of the aforementioned toner manufacturing methods of first and second aspects of the present invention.

The detail of the toner of the present invention is revealed through the illustration of the toner manufacturing method of the present invention.

Next, components constituting the toner of the present invention are described. The constituent of the toner is preferably any one of the following mixtures (1) to (4):

(1) a mixture containing at least a binding resin and a colorant;

(2) a mixture containing at least a binding resin, a colorant and a charge controller;

(3) a mixture containing at least a binding resin, a colorant, a charge controller and a wax; or (4) a mixture containing at least a binding resin, a magnetizing agent, a charge controller, a wax and a magnetizing agent.

The binding resin is not particularly restricted and can be appropriately selected from heretofore known resins, but a thermoplastic resin is preferable.

Examples of the binding resin include vinyl resins, polyester resins and polyol resins. These may be used alone or in combination of two or more types. Among these, polyester resins and polyol resins are particularly preferable.

Examples of the vinyl resins include: a monopolymer of styrene or its substitution products such as polystyrene, poly-p-chlorostyrene, polyvinyltoluene; a styrene copolymer such as styrene p-chlorostyrene copolymer, styrene propylene copolymer, styrene vinyltoluene copolymer, styrene vinylnaphthalene copolymer, styrene methyl acrylate copolymer, styrene ethyl acrylate copolymer, styrene butyl acrylate copolymer, styrene octyl acrylate copolymer, styrene methyl methacrylate copolymer, styrene ethyl methacrylate copolymer, styrene butyl methacrylate copolymer, styrene methyl-α-chloromethacrylate copolymer, styrene-acrylonitrile copolymer, styrene vinyl methyl ether copolymer, styrene vinyl ethyl ether copolymer, styrene vinyl methyl ketone copolymer, styrene butadiene copolymer, styrene isoprene copolymer, styrene acrylonitrile indene copolymer, styrene maleic acid copolymer and styrene maleate copolymer; a polymethyl methacrylate, a polybutyl methacrylate, a polyvinyl chloride and a polyvinyl acetate.

The polyester resins are divided into two groups below: dihydric alcohols in group A below and dibasic salts in group B below. Furthermore, an alcohol or a carbonic acid with three or more valences shown as group C may be added as a third component.

The group A includes, for example, ethylene glycol triethylene glycol 1,2-propylene glycol 1,3-propylene glycol, 1,4-butanediol, neopentyl glycol 1,4-butenediol, 1,4-bis(hydroxymethyl)cyclohexane, bisphenol A, hydrogenated bisphenol A, polyoxyethylene bisphenol A, polyoxypropylene(2,2)-2,2'-bis(4-hydroxyphenyl)propane, polyoxypropylene(3,3)-2,2-bis(4-hydroxyphenyl)propane, polyoxyethylene(2,0)-2,2-bis(4-hydroxyphenyl)propane and polyoxypropylene(2,0)-2,2'-bis(4-hydroxyphenyl)propane.

The group B includes, for example, maleic acid, fumaric acid, mesaconic acid, citraconic acid, itaconic acid, glutaconic acid, phthalic acid, isophthalic acid, terephthalic acid, cyclohexanedicarboxylic acid, succinic acid, adipic acid, sebacic acid, malonic acid, linolenic acid; and an acid anhydride thereof or an ester thereof with a lower alcohol.

The group C includes, for example, an alcohol with three or more valences such as glycerin, trimethylolpropane and pentaerythritol; and a carboxylic acid with three or more valences such as trimellitic acid and pyromellitic acid.

Examples of the polyol resins include an alkylene oxide adduct of epoxy resin with dihydric phenol; a product of a compound having a glycidyl ether thereof and one active hydrogen per molecule that is reactive with epoxy group reacted with a compound having two or more active hydrogen per molecule atoms reactive with epoxy group.

Moreover, the following resins may be additionally mixed according to requirements: epoxy resins, polyamide resins, urethane resins, phenol resins, butyral resins, rosins, modified rosins and terpene resins, for example. A typical example of the epoxy resins is a polycondensate of bisphenol such as bisphenol A and bisphenol F with epichlorohydrin.

The colorant is not particularly restricted and can be selected from heretofore known colorants according to applications. Examples thereof are listed below. These may be used alone or in combination of two or more types.

Examples of a black pigment includes an azine pigment such as carbon black, oil furnace black, channel black, lamp black acetylene black and aniline black; an metallic azo pigment, a metallic oxide and an oxide of composite metal.

Examples of a yellow pigment include cadmium yellow, mineral fast yellow, nickel titanium yellow, navels yellow, naphthol yellow S, hansa yellow G, hansa yellow 10G, benzidine yellow GR, quinoline yellow lake, permanent yellow NCG and tartrazine lake.

Examples of an orange pigment include molybdenum orange, permanent orange GTR, pyrazolone orange, vulcan orange, indanthrene brilliant orange RK, benzidine orange G and indanthrene brilliant orange GK Examples of a red pigment include red iron oxide, cadmium red, permanent red 4R, lithol red, pyrazolone red, watchung red calcium salt, lake red D, brilliant carmine 6B, eosine lake, Rhodamine lake B, alizarin lake and brilliant carmine 3B.

Examples of a purple pigment include fast violet B and methyl violet lake.

Examples of a blue pigment include cobalt blue, alkali blue, Victoria blue lake, phthalocyanine blue, metal-free phthalocyanine blue, phthalocyanine blue partial chlorine compound, fast sky blue and indanthrene blue BC.

Examples of a green pigment includes chrome green, chrome oxide green, pigment green B and malachite green lake.

The content of the colorant per 100 parts by mass of the binding resin is preferably 0.1 parts by mass to 50 parts by mass, and more preferably 5 parts by mass to 20 parts by mass.

The wax is introduced to give the toner a releasing property. It is not particularly restricted and can be appropriately selected from heretofore known waxes according to applications. Examples thereof include a synthetic wax such as low molecular weight polyethylene and polypropylene, and a natural wax such as carnauba wax, rice wax and lanolin.

The content of the wax is preferably 1% by mass to 20% by mass, and more preferably 3% by mass to 10% by mass.

The charge controller is not particularly restricted and can be appropriately selected from heretofore known charge controllers according to applications. Examples thereof include a nigrosine, an acetylacetone metal complex, monoazo metal complex, naphthoic acid; an aliphatic acid metal salt such as metal salt of a salicylic acid and metal salt of a salicylic acid derivative; a triphenylmethane dye, a molybdic acid chelate pigment, a Rhodamine dye, an alkoxy amine, quaternary ammonium salt including fluorine-modified quaternary ammonium salt, phosphorus as an element or a compound, tungsten as an element or a compound and a fluorine activator. These may be used alone or in combination of two or more types.

The content of the charge controller is preferably 0.1% by mass to 10% by mass, and more preferably 0.5% by mass to 5% by mass.

The magnetizing agent is not particularly restricted and can be appropriately selected from heretofore known magnetizing agents according to applications. Examples thereof include hematite, iron powder, magnetite and ferrite.

The content of the magnetizing agent is preferably 5% by mass to 50% by mass, and more preferably 10% by mass to 30% by mass.

Furthermore, an inorganic fine powder such as silica fine powder and titanium oxide fine powder may be externally added in order to give the toner flowability.

Also, a toner obtained through a classification treatment of a spray granulation substance according to the manufacturing method of the present invention has a mass average particle diameter of preferably 3.0 µm to 10.0 µm, and more preferably 4.0 µm to 7.0 µm, for improving the tone reproducibility in an image formation. When the mass average particle diameter is less than 3.0 µm, the cohesiveness of the toner increases, and the decrease in the tone reproduction property in terms of image quality and background smear may occur. The mass average particle diameter exceeding 10.0 µm may results in decreased sharpness, voids in solid portions and white spots.

Also, according to the manufacturing method of a spray granulation toner for electrophotography of the resent invention, a spray granulation substance is classified for improved dot reproduction in an image formation, where the ratio of the mass average particle diameter to the number average particle diameter is preferably 1.03 to 1.50, and more preferably 1.06 to 1.28. The ratio of less than 1.03 may significantly decreases the productivity although it increases the image quality. The ratio exceeding 1.50 may result in a crumbling image and nonuniformity in transfer.

Here, the ratio of the mass average particle diameter and the ratio of the mass average particle diameter to the number average particle diameter may be measured by means of a particle size measuring apparatus, COULTER COUNTER Multisizer, manufactured by Beckman Coulter, Ltd.

Also, according to the manufacturing method of a spray granulation toner for electrophotography of the resent invention, the average sphericity of the toner is preferably 0.85 to 0.99, and more preferably 0.94 to 0.97. The average sphericity of less than 0.85 may result in decreased tone reproducibility and background smear. The average sphericity exceeding 0.99 may result in insufficient cleaning.

The average sphericity may be measured by means of an optical detection band method, where a suspension including toner particles are passed through an imaging detection band on a plate, and the image of the particles are optically detected and analyzed with a CCD camera. The average sphericity may be determined with, for example, a flow particle image analyzer FPIA-2100, manufactured by Toa Medical Electronics Co., Ltd.

The content of fine powder of 2 µm or less is preferably 15% by number, or less, and more preferably 5% by number or less. The content of the fine powder exceeding 15% by number may result in decreased tone reproducibility and background smear.

Here, the content of the fine powder of 2 µm or less may be measured with, for example, a flow particle image analyzer.

The toner manufacturing method of the present invention is illustrated in more detail with reference to figures and with comparison to conventional techniques where appropriate.

In a conventional technique shown in FIG. 1, compressed air 6-2 for spraying heated by a heat exchanger 8 guides a toner melted in a melting unit 2-1 and is sprayed from a high-pressure gas nozzle 4. At the top of a chamber 3 attached are co-flow air ring nozzles 9-1 along the high-pressure gas nozzle 4, and by uniformly streaming secondary air in a ring form with respect to the inner diameter of the chamber 3, the sprayed toner is cooled for granulation. Also, by the secondary air sprayed from the co-flow air ring nozzles 9-1, the retention in the chamber is prevented as well as the flow in the direction to the bottom of the chamber, i.e. in the vertical direction, is generated. The air sprayed in the chamber and a spray granulate substance 6 pass through a cyclone 7-1, and the granulated substance is recovered in a recovery container 7-2. In spray granulation, the compressed air 6-1 for spraying requires temperature regulation by means of the spray heat exchanger 8 for arranging the granulation diameter. The temperature is regulated in the range of 150° C. to 350° C. Also, the co-flow air used for the flow in the chamber and the cooling of the spray product undergoes a temperature regulation by means of a co-flow heat exchanger 9-2. The temperature is regulated in the range of 100° C. to 300° C.

The following issues are present in the conventional granulation method:

(i) The energy efficiency decreases because of the use of the compressed air for spraying from the co-flow air ring nozzle;

(ii) The thermal energy efficiency decreases because of the use of the heat exchanger for spraying from the co-flow air ring nozzle;

(iii) The volume of the chamber increases required for securing the flight distance of the spray because of ensuring the cooling time needed for the use of the co-flow air ring nozzle; and (v) The product yield decreases because the increase in the speed of the spray granulation by the spray air from the co-flow air ring nozzle and the high residual temperature in the chamber melt the granulation product again and fuse it at the bottom of the chamber. It is desirable that the bottom of the chamber is cooled promptly upon the completion of the granulation and cooling of the particles.

Figure 2:
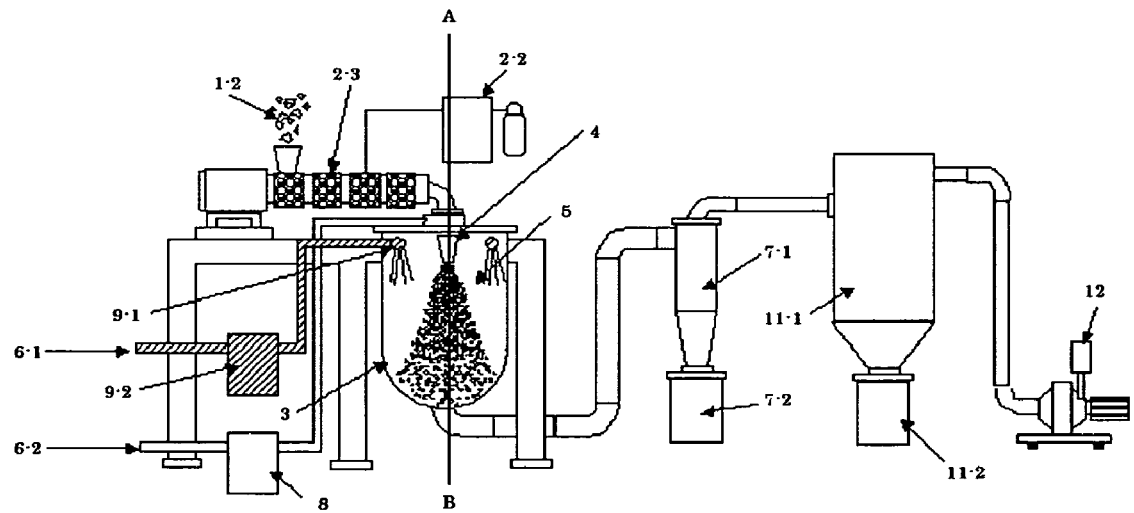
FIG. 2 is a diagram showing another example of a spray granulation process by means of a conventional spray granulation apparatus.

Also, (2) of the conventional techniques, i.e. prior arts, shown in FIG. 2 had the same problems as those (i) to (iv) listed above for FIG. 1. Here, in the conventional technique (2), i.e. the manufacturing method for an electrophotographic toner, any one mixture selected from (1) to (4) below is mixed under pressure or uniformly mixed with injection of a supercritical fluid: (1) a mixture containing at least a binding resin and a colorant, (2) a mixture containing at least a binding resin, a colorant and a charge controller, (3) a mixture containing at least a binding resin, a colorant, a charge controller and a wax, or (4) a mixture at least a binding resin, a charge controller, a wax and a magnetizing agent; then, the mixture is discharged and sprayed in a chamber by means of a high-pressure gas for atomization.

Figure 3:
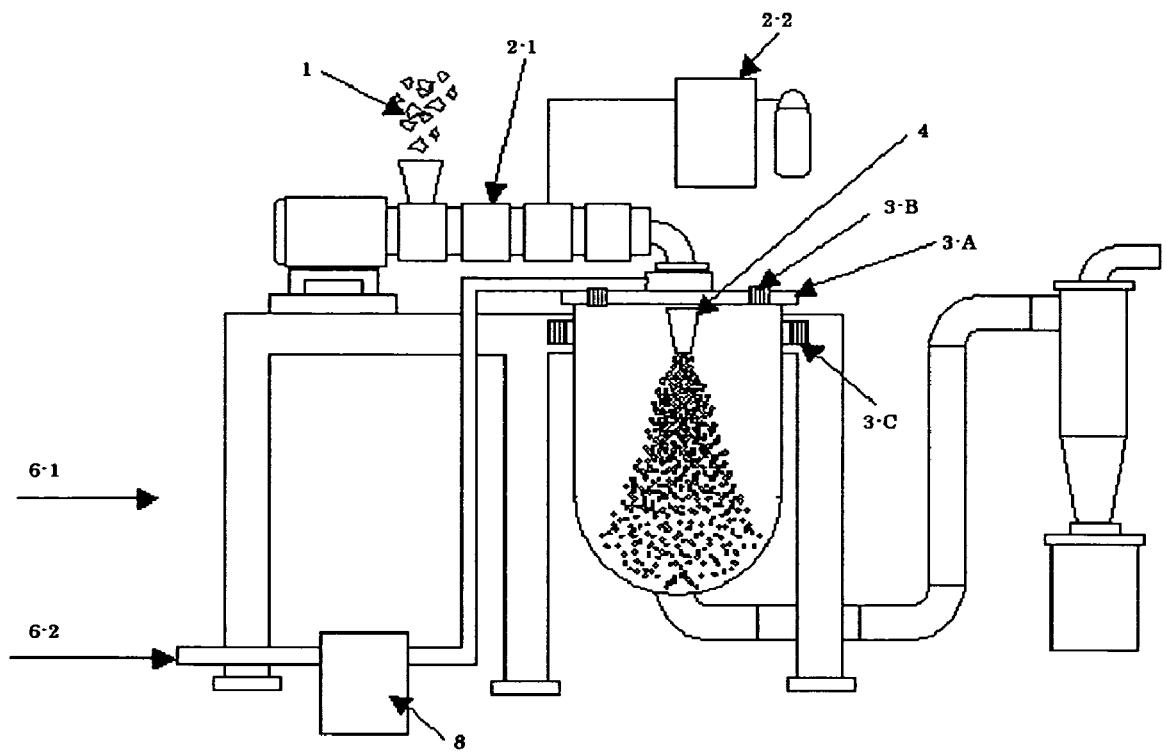
FIG. 3 is a diagram showing an example of a spray granulation process by means of a spray granulation apparatus of the present invention.

In the present invention, the ring of the co-flow air ring nozzle shown in FIG. 1 is replaced by upper secondary air holes 3-B allocated at an chamber top lid 3-A on top of a chamber 3 shown in FIG. 3 or sidewall secondary air holes 3-C located on the sidewall of the chamber 3. This allows the toner sprayed from a high-pressure gas nozzle 4 to cool by means of the air, i.e. atmosphere, and the above problems are resolved.

Figure 4:
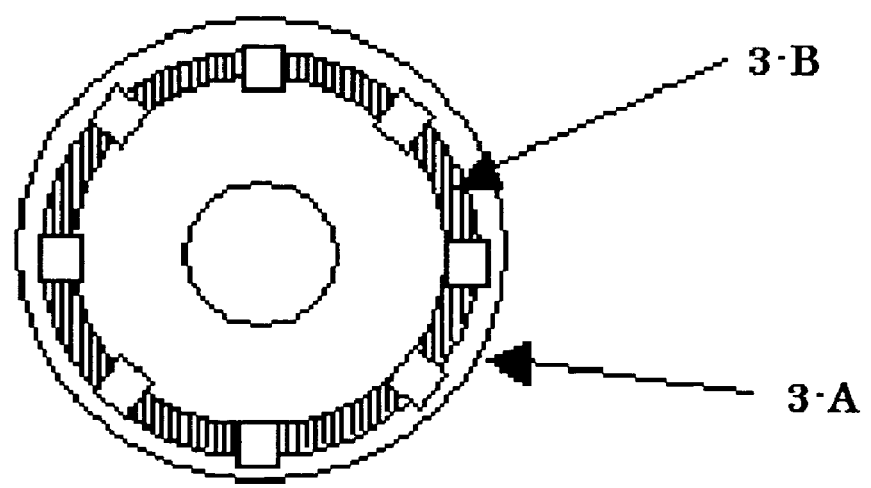
FIG. 4 is a diagram showing an example of a chamber used in a spray granulation process of the present invention.
Figure 5:
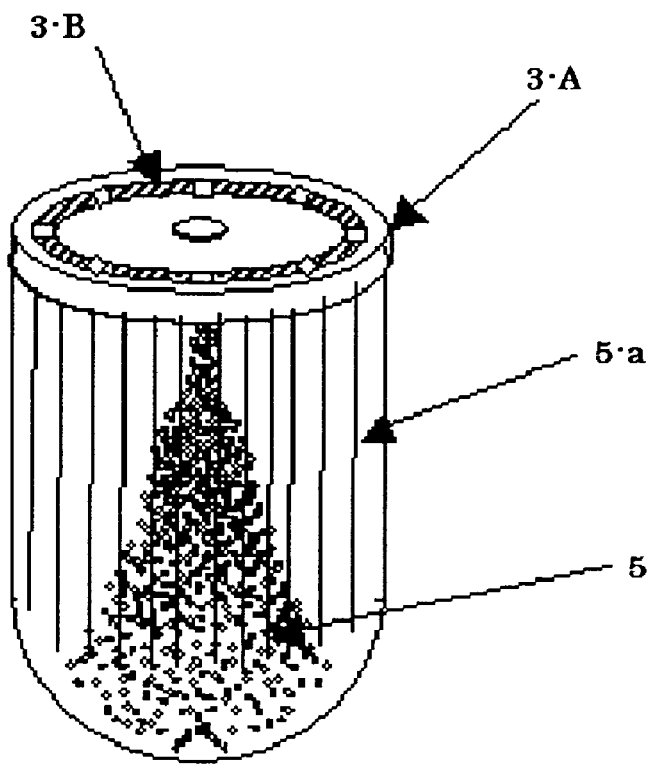
FIG. 5 is a diagram showing another example of a chamber used in a spray granulation process of the present invention.
Figure 6:
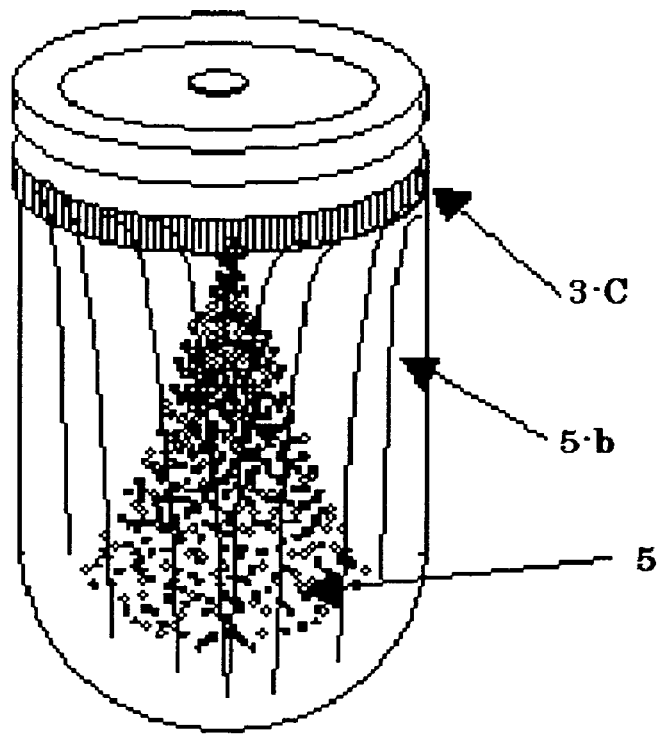
FIG. 6 is a diagram showing another example of a chamber used in a spray granulation process of the present invention.
Figure 7:
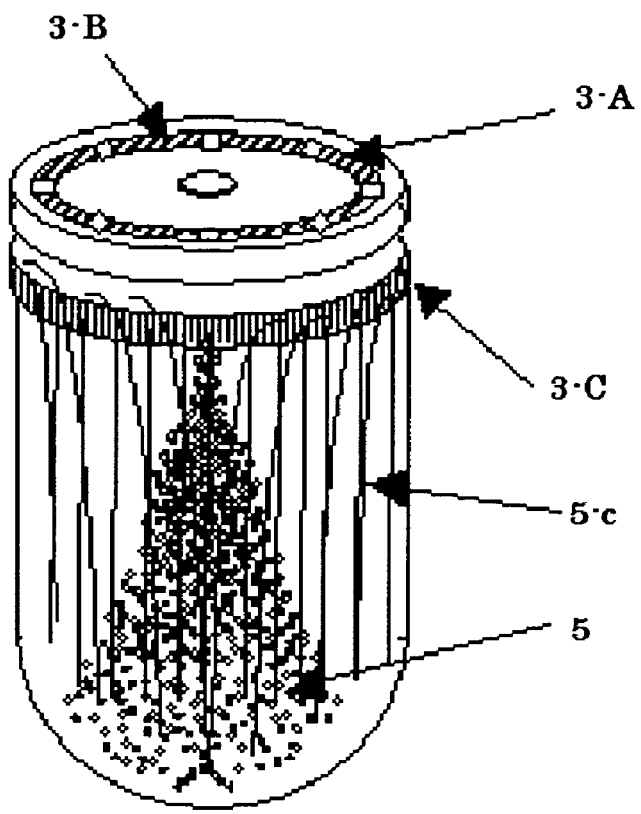
FIG. 7 is a diagram showing another example of a chamber used in a spray granulation process of the present invention.

FIG. 4. shows a top view of the chamber top lid 3-A on which the upper secondary air holes 3-B are allocated. FIG. 5 is a single view drawing of the chamber top lid 3-A on which the secondary air holes 3-B are allocated. FIG. 6 is a single view drawing of sidewall secondary air holes 3-C. FIG. 7 is a single view drawing showing the combination of the mechanisms shown in FIGS. 5 and 6.

In the toner manufacturing method of the present invention, it is preferable that the air inlet enables the formation of a swirling flow and that the granulation takes place with cooling intake air flown from this air inlet.

Figure 8:
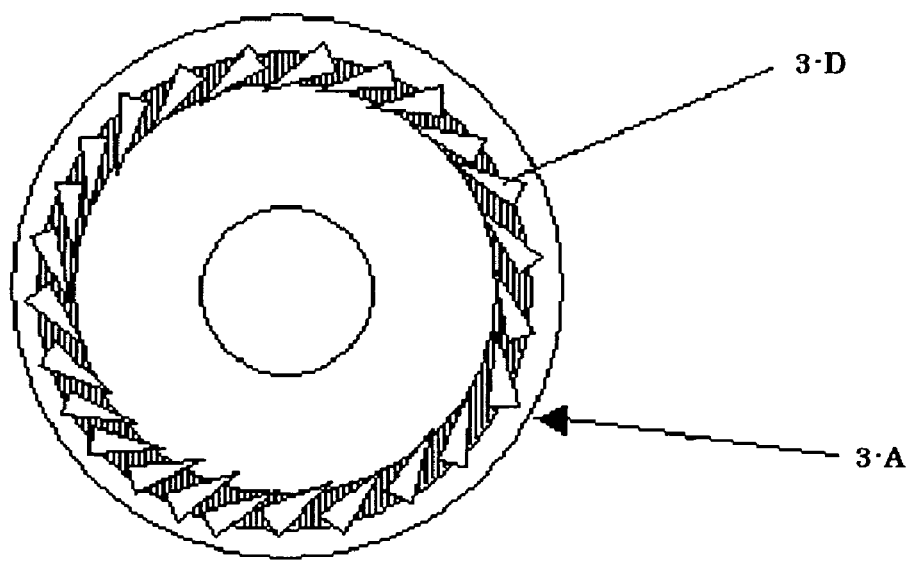
FIG. 8 is a diagram showing another example of a chamber used in a spray granulation process of the present invention.
Figure 9:
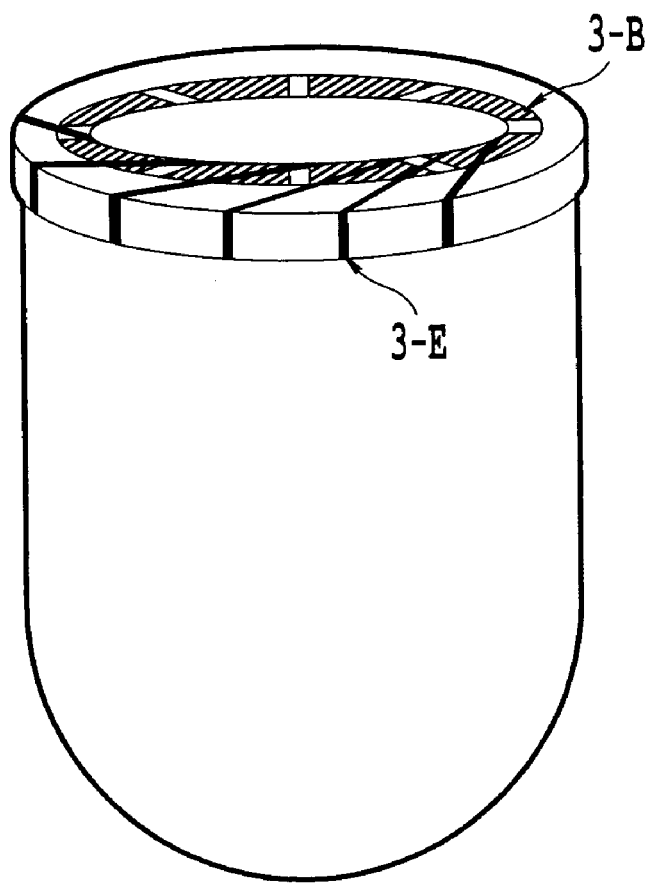
FIG. 9 is a diagram showing another example of a chamber used in a spray granulation process of the present invention.

The toner manufacturing method of the present invention is further characterized by guide vanes 3-D and 3-E for generating a swirling flow of the secondary air in the chamber flown in from the secondary air holes 3-A and 3-B shown in FIGS. 8 and 9. The swirling flow cools the spray toner and maintains the retention time for granulation; therefore, the above problems are resolved.

According to the toner manufacturing method of the present invention, the air inlet has a gate which allows the adjustment of its cross-sectional area. It is preferable that the cooling intake air is flown from this air inlet for granulation.

The toner manufacturing method of the present invention is further characterized by, for example, guide vanes 3-D and 3-E arranged so that the secondary air flowing from the secondary air holes 3-A and 3-B rotationally flows inside the chamber. The swirling flow cools the sprayed toner manufactured by the toner manufacturing method of the present invention and moreover maintains the retention time thereof therefore, the above problems are resolved.

In the toner manufacturing method of the present invention, the air inlet of the chamber is preferably covered with a sound insulating material.

For example, as shown in FIGS. 3 to 10, a sound insulating material 103 is allocated at the secondary air holes, and the suction sound generated by the secondary air flowing or rotationally flowing into the chamber is reduced. The sound insulating material reduces the noise during the spray granulation, which improves the work environment. As for the sound insulating material, a material composed of a CALM material such as NEOCALM and BIOCALM has superior durability and handleability, but it is not restricted to these.

In the toner manufacturing method of the present invention, the static pressure P for the granulation in the chamber preferably satisfies the following relation: $-0.01 \text{ MPa} \leq P \leq 0.01 \text{ MPa}$.

An example thereof is a manufacturing method of a toner for electrophotography shown in FIGS. 3 to 9 with further improvements for granulation, where the static pressure in the chamber is manipulated with a blower 12 in accordance with the spray air flow rate and the secondary air suction rate so that the static pressure P satisfies the above condition.

The toner manufacturing method of the present invention preferably has a jacket for temperature regulation formed on the outer surface of the chamber for granulation.

Figure 12:
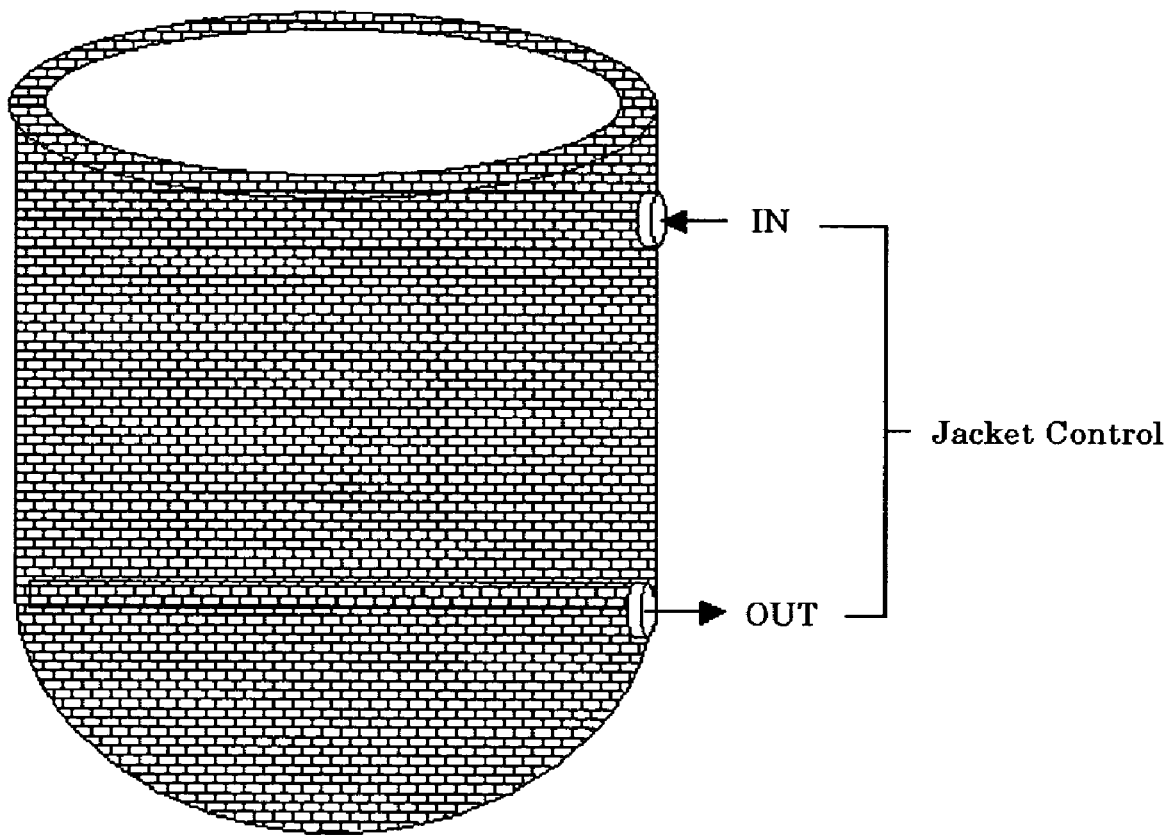
FIG. 12 is a diagram showing another example of a sound insulating material used for a chamber.

FIG. 12 shows an example that a jacket is formed for regulating the temperature in a chamber. A manufacturing method of a toner for electrophotography with further improvements for granulation has a jacket for temperature regulation formed on the outer surface of the chamber for easier control of the temperature in the chamber.

In the toner manufacturing method of the present invention, the chamber preferably has a heat insulating mechanism divided into multiple segments on the outer surface of the chamber for granulation.

Figure 13:
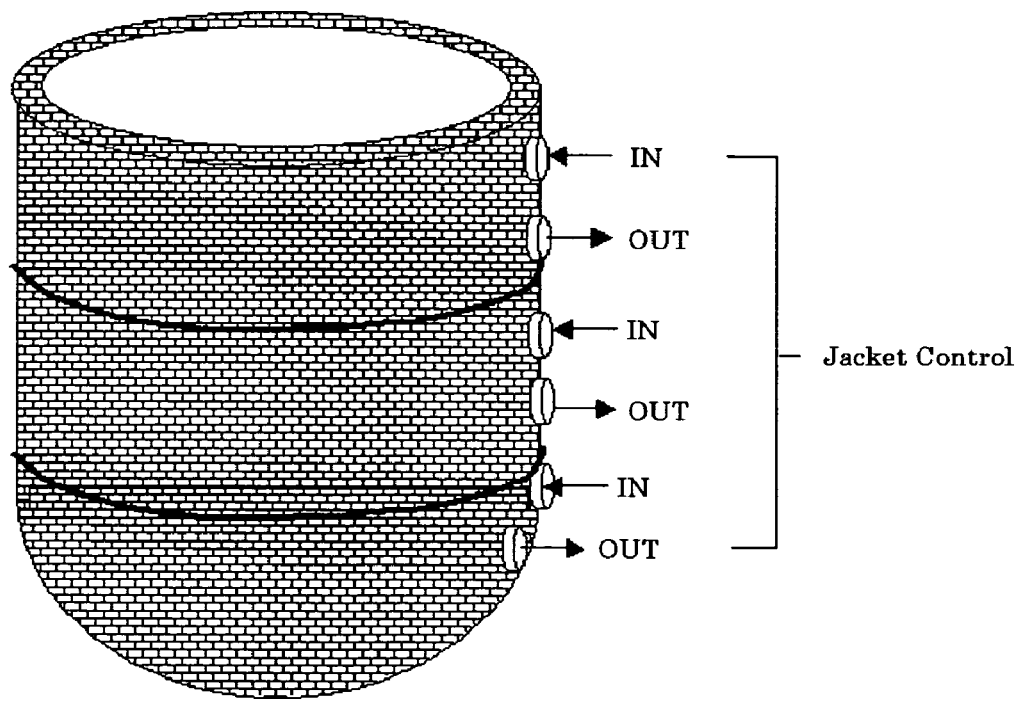
FIG. 13 is a diagram showing another example of a sound insulating material used for a chamber.

FIG. 13 shows an example that a jacket is formed for regulating the temperature in a chamber. A manufacturing method of a toner for electrophotography with further improvements for granulation has a jacket for temperature regulation divided into multiple segments and formed on the outer surface of the chamber for easier control of the temperature in the chamber.

In the toner manufacturing method of the present invention, a sound insulating mechanism is formed on the outer surface of the chamber for granulation.

Figure 14:
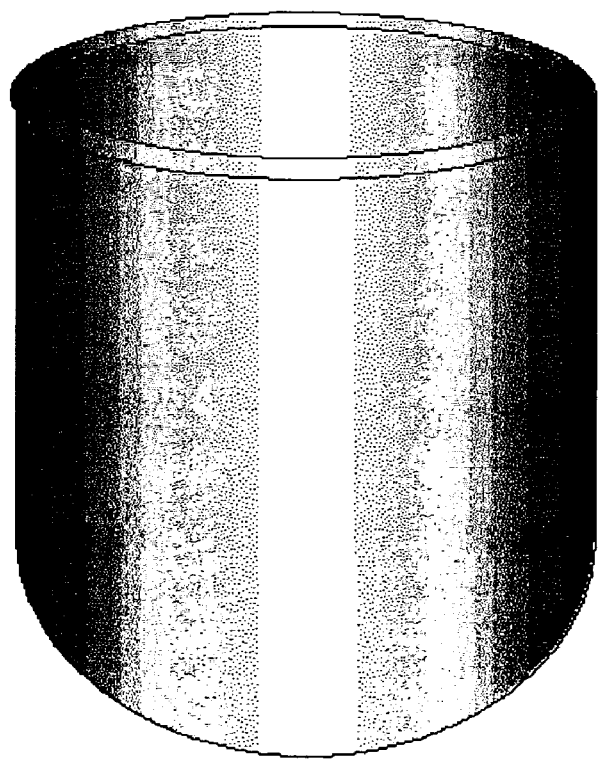
FIG. 14 is a diagram showing another example of a sound insulating material used for a chamber.

FIG. 14 shows an example of a sound insulating material allocated for the reduction of the noise during spray granulation. The sound insulating material reduces the noise during the spray granulation compared that without the sound insulating material which improves the work environment. As for the sound insulating material, a material composed of a CALM material such as NEOCALM and BIOCALM are particularly favorable in terms of superior durability and handleability.

In the toner manufacturing method of the present invention, materials are preferably melt mixed and then sprayed by a high-pressure gas nozzle while the temperature of the melt mixing unit to which a supercritical fluid is injected and dispersed is maintained in the range of $-10°$ C. to $+100°$ C. from the melting point or the initial efflux temperature of the toner or $+30°$ C. to $+150°$ C. from the glass transition point of the toner.

In the toner manufacturing method of the present invention, an ultrasonic pulse of 10 kHz to 80 kHz is generated by or irradiated to the high-pressure gas.

In the toner manufacturing method of the present invention by spray granulation, the heat transfer efficiency is improved by the secondary air which introduces the spray-granulated toner into the chamber, and the noise during the suction of the secondary air is eliminated with the application of the sound insulating material. As stated, the toner manufacturing method of the present invention by spray granulation is a method in which (1) a mixture containing at least a binding resin and a colorant, (2) a mixture containing at least a binding resin, a colorant and a charge controller, (3) a mixture containing at least a binding resin, a colorant, a charge controller and (4) a mixture containing at least a binding resin, a charge controller, a wax and a magnetizing agent is uniformly mixed with an injection of a supercritical fluid, to which a high-pressure gas is sprayed for atomization. FIG. 1 shows a conventional technology, i.e. prior art, and the present invention is equivalent to the manufacturing method schematically shown in FIG. 1 with secondary air holes 3-A and 3-B in FIG. 3 for improvements. Therefore, the concept illustrating an example of a toner manufacturing method of the present invention by spray granulation of a supercritical fluid is explained with an assumption that FIG. 1 has secondary air holes 3-A and 3-B to avoid duplication. A mixture 1 which has been prepared in advance is introduced in a melting unit 2-1. During melt mixing, the mixture is melted with a supercritical fluid regulator 2-2, and the melted substance discharged from the melting unit is sprayed with compressed air 6 discharged from a high-pressure gas nozzle 4 allocated inside a chamber 3. At this point, secondary air is introduced from the top and the side of the chamber as shown in FIG. 3, and a spray granulation substance 5 is produced. During the diffusion in the chamber, the spray granulation substance 5 enspheres itself by means of its own surface tension with the cooling action of the incoming air from all circumferences shown in FIG. 7, and a toner is prepared.

As the second toner manufacturing method of the present invention by supercritical fluid spray granulation is a method where (1) a mixture containing at least a binding resin and a colorant, (2) a mixture containing at least a binding resin, a colorant and a charge controller, (3) a mixture containing at least a binding resin, a colorant, a charge controller and a wax or (4) a mixture containing at least a binding resin, a charge controller, a wax and a magnetizing agent is uniformly mixed followed by supercritical fusion, and the projected high-pressure gas is sprayed for atomization. The first method and the second method are used depending on the characteristics of the toner materials and the required product quality The second method is applied when the toner materials are easily dispersed, and the first method is preferable when the toner material is not easily dispersed.

FIG. 2 shows another example of the conventional technology, i.e. prior art, and the present invention is equivalent to the manufacturing method schematically shown in FIG. 1 with secondary air holes 3-A and 3-B in FIG. 3 for improvements. Therefore, the concept illustrating one example of a toner manufacturing method of the present invention by spray granulation of a supercritical fluid is explained with an assumption that FIG. 2 has secondary air holes 3-A and 3-B to avoid duplication. The mixture 1-2 is introduced in a melting unit 2-3. During melt mixing, the mixture is fused with a supercritical fluid regulator. 2-2, and the melted substance discharged from the melting unit is sprayed with compressed air 6 discharged from a high-pressure gas nozzle 4 allocated inside a chamber 3. At this point, secondary air is introduced from the top and the side of the chamber as shown in FIG. 3, and a spray granulation substance 5 is produced.

During the diffusion in the chamber, the spray granulation substance 5 enspheres itself by means of its own surface tension with the cooling action of the incoming air from all circumferences shown in FIG. 7. The mixture 1-2 is introduced in the mixing unit 2-3 (extruder). Although self-heating is observed due to its high viscosity at the start of the dispersion and shearing in the mixing unit, the self-heating temperature as well as the viscosity decreases as the mixing progresses. The melt condition is similar to that of the first method when the mixing is complete. The mixture is sprayed with a high-pressure nozzle 4, and a spray granulation substance 5 is produced. During the diffusion in the chamber, the spray granulation substance 5 enspheres itself by means of its own surface tension with the cooling action, and a toner is prepared.

Also, among the conditions of toner spray granulation in the first and second methods, the temperature of mixing or melting can be neither too low nor too high for stable particle properties compared to the initial efflux temperature of the toner or the binding resin. When the temperature is too low, the particles tend to be fibrous. When the temperature is too high, the materials are carbonized, likely impairing the toner properties. The temperature difference from the melting point or the initial efflux temperature of the toner is $-10°$ C. to $+100°$ C., preferably $-10°$ C. to $+80°$ C., and more preferably $-10°$ C. to $+50°$ C.

In addition, among the conditions of toner spray granulation of a supercritical fluid, the optimal granulation cannot be achieved when the melt temperature is either too low or too high compared to the glass transition temperature of the toner or the binding resin. When the melt temperature is too low, fine powder particles and fibrous particles coexist, which are unwanted for spray granulation toner for electrophotography. When the temperature is too high, the surface tension in cooling decreases and the average sphericity of the particles tends to be lost. The melt temperature appropriate in terms of the temperature difference from the glass transition temperature is preferably $+10°$ C. to $+100°$ C., and more preferably $+20°$ C. to $+80°$ C.

Furthermore, among the conditions of toner spray granulation, the optimal granulation, i.e. uniform particle granulation, cannot be achieved when the melt viscosity is either too low or too high. When the viscosity is too low, the granulation tends to result in fine powder particles, which are unwanted for spray granulation toner for electrophotography. When the viscosity is too high, the granulation tends to result in increased coarse particles. The viscosity is preferably 1 Pa·s to 400 Pa·s, more preferably 1 Pa·s to 200 Pa·s, and most preferably 1 Pa·s to 10 Pa·s.

Figure 15:
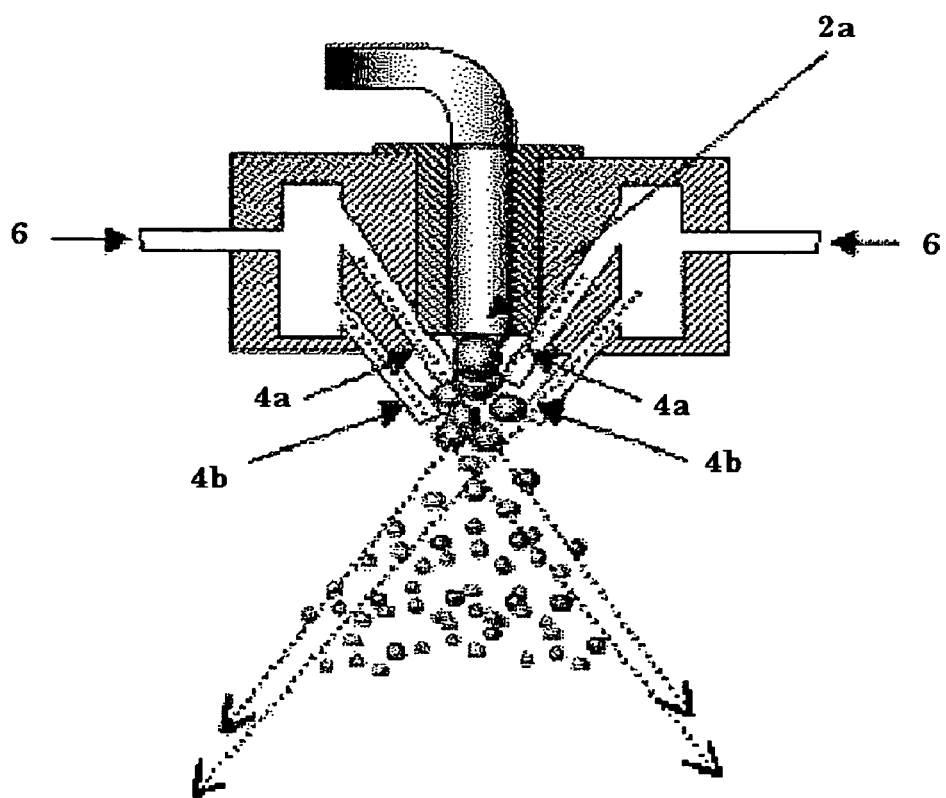
FIG. 15 is a cross-sectional diagram in the vertical direction of the high-pressure nozzle shown in FIGS. 1 and 2.
Figure 16:
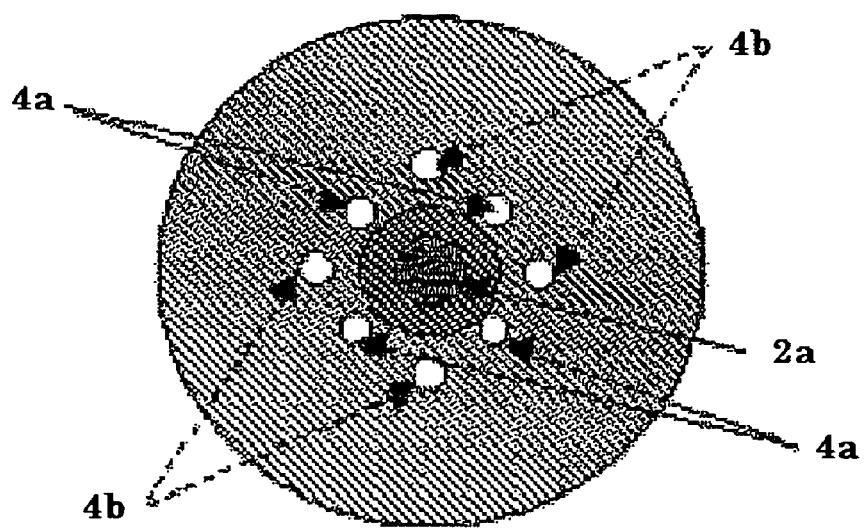
FIG. 16 is a cross-sectional diagram in the horizontal direction of the high-pressure nozzle shown in FIGS. 1 and 2.
Figure 17A:
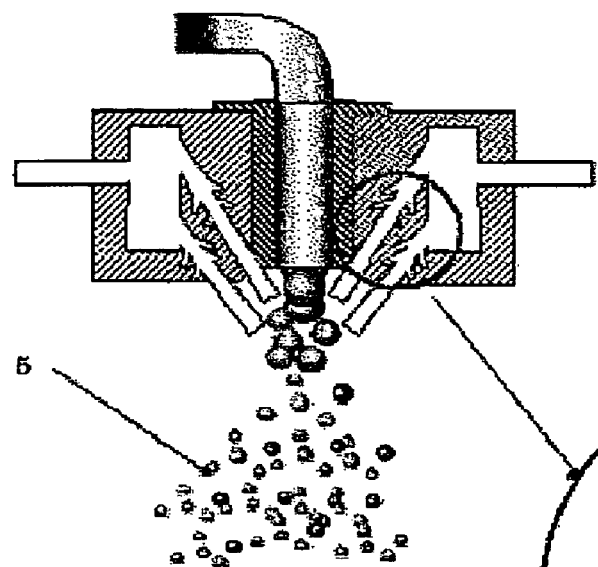
FIG. 17A is a cross-sectional diagram in the vertical direction of the high-pressure nozzle shown in FIGS. 1 and 2.
Figure 17B:
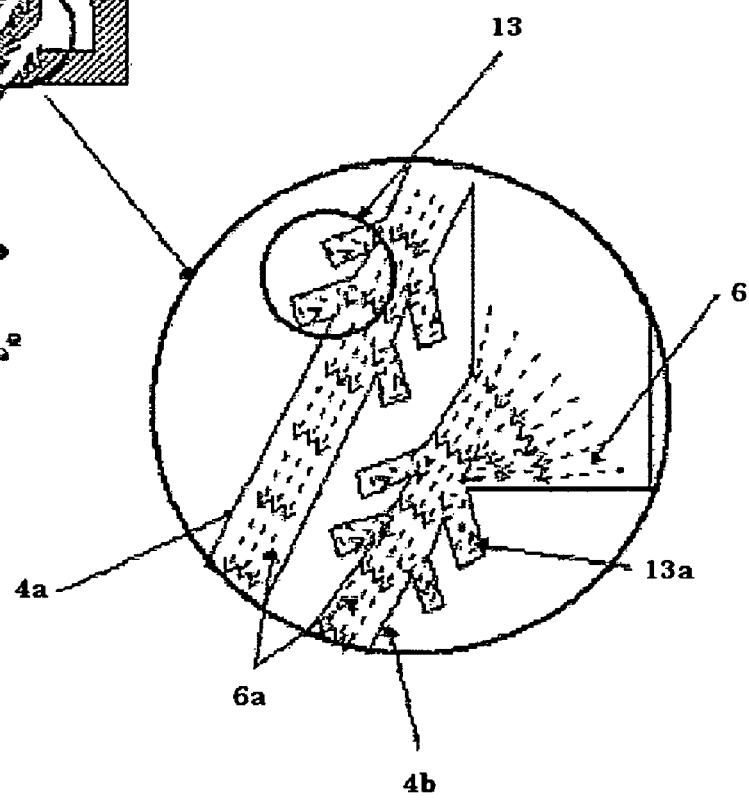
FIG. 17B is an enlarged view of the high-pressure nozzle shown in FIG. 17A.

The apparatus used for the production of the spray granulated toner for electrophotography of the present invention preferably has four to 20 spray nozzles for spray granulation per extruding die for a melt-mixed material for the reasons described below. FIGS. 17A and 17B show an enlarged view of the high-pressure nozzle shown in FIGS. 1 and 2. FIG. 15 shows a cross-sectional diagram in the vertical direction AB of the high-pressure nozzle shown in FIGS. 1 and 2. FIG. 16 is a cross-sectional diagram in the horizontal direction of the high-pressure nozzle shown in FIGS. 1 and 2. A melt-mixed material discharge nozzle 2a is installed at the central part of the high-pressure nozzle 4. Around the melt-mixed material discharge nozzle 2a, spray nozzles 4a distributed from the high-pressure nozzle is installed, and further around the spray nozzles 4a, distributed spray nozzles 4b are installed. These spray nozzles form a de Laval structure for ultrasonic spraying or a straight structure for high-pressure spraying. Ultrasonic air or high-pressure air is sprayed from these spray nozzles over the melt-mixed toner materials discharged from the extruding die for a melt-mixed material. After the primary cross collision of the spray nozzles 4A, the secondary cross collision at the tip of the spray nozzles 4b occurs. The shearing action thereof atomizes the melt-mixed materials. The number of the spray nozzles is preferably four to eight in order to obtain the correct occurrence of gas to liquid collisions without creating droplet to droplet collisions according to the viscosity of the liquid material and the desired particle diameter.

In the toner manufacturing method of the present invention, granulation with ultrasonic pulse of 10 kHz to 80 kHz generated by or irradiated to the high-pressure gas protruded from the spray nozzles is preferable for the following reason. FIG. 15 shows a cross-sectional diagram in the vertical direction AB of the high-pressure nozzle shown in FIGS. 1 and 2, and FIGS. 17A and 17B show an enlarged view of the high-pressure nozzle shown in FIGS. 1 and 2. Retention zone of compressed air 6 is formed inside the spray nozzles 4a and 4b. When sprayed through the spray nozzles 4a, the compressed air 6a is entrained in the retention zones 13, stays (13a) there and returns to the main stream 6a. At this point, the turbulence of the airflow caused by the collision within the airflow results in an ultrasonic pulse. The powerful shearing action imposed by the ultrasonic pulses atomizes the melt-mixed materials. The frequency of this generated ultrasonic pulse is preferably 10 kHz to 80 kHz, and more preferably 20 kHz to 60 kHz. By employing a method disclosed in International Publication No. WO 02/089998 for a pulse generating mechanism like this, the atomization of particles with small pressure drop and low energy.

In the toner manufacturing method of the present invention, the granulation inside the chamber is preferably uniform by adjusting the pressure in the chamber for spray granulation. The pressure in the chamber is preferably $-0.01$ MPa to 0.01 MPa, and more preferably $-0.005$ MPa to 0.005 MPa. In the examples shown in FIGS. 1 and 2 having secondary air holes 3-A and 3-B, the pressure is regulated by a fan 12 sucking inside the chamber 3.

It is preferable that in the toner manufacturing method of the present invention the spray granulation may be performed with ease by means of the temperature regulation of the high-pressure air for spray granulation. The examples shown in FIGS. 1 and 2 (with secondary air holes 3-A and 3-B) shows heat exchangers 8 equipped for the high-pressure air 6-2. The cross collision and the shearing action of the melt-mixed materials discharged is facilitated for easy powder granulation. The high-pressure air preferably has a temperature of 50° C. to 200° C., and more preferably 70° C. to 200° C.

In the toner manufacturing method of the present invention, the temperature regulation for melt-mixing a binding resin, a colorant, a charge controller or a wax in the melting unit 2-1 or a mixing unit 2-3, which are exemplarily shown in FIGS. 1 and 2 (with secondary air holes 3-A and 3-B), is effective in preventing the degradation of the materials by the dispersion property and the heat history of the spray granulated toner materials. The temperature for melt mixing is preferably 50° C. to 200° C., and more preferably 70° C. to 180° C.

In the toner manufacturing method of the present invention, the temperature regulation in the chamber for spray granulation is effective for ensphering the sprayed particles. In the examples shown in FIGS. 1 and 2 (with secondary air holes 3-A and 3-B), a sprayed particle enspheres itself by means of its own surface tension. This requires quenching for preventing the secondary aggregation caused by collisions among the ensphered particles. Therefore, the temperature inside the chamber is preferably regulated at −10° C. to 80° C., and more preferably 20° C. to 50° C.

According to the toner manufacturing method of the present invention, for the cooling granulation in a dry spray granulation process, the suction of the secondary air from the top, the side, or the top and the side of the chamber increases the heat transfer efficiency in granulation and the yield of the granulated substance. In addition, the noise control is achieved by the installation of a sound insulating material is installed at the secondary air holes or on the whole surface of the chamber, which improves the work environment.

(Developer)

The developer of the present invention includes at least the toner of the present invention, and it further includes other components appropriately selected such as carrier. The developer may be a one-component developer or a two-component developer; however, the two-component developer is preferable in terms of improved lifetime in case of using the toner in a high-speed printer which is compliant with the recent enhancement in the information-processing speed.

Regarding the one-component developer using the toner of the present invention, the fluctuation in the toner particle diameter is minimal even when the toner inflow and outflow are balanced. The toner filming to a developing roller and the toner adhesion to members such as blade for thin-film formation do not occur. Therefore, the favorable and stable developing properties and image quality may be achieved even in a long-term usage (agitation) of the developing unit. Also, regarding the two-component developer using the toner of the present invention, the fluctuation in the toner particle diameter is minimal even when the toner inflow and outflow are balanced, and the favorable and stable developing properties may be achieved even in a long-term agitation in the developing unit.

The carrier is not particularly restricted and can be selected according to applications. The carrier preferably contains a core and a resin layer that covers the core.

The material for the core is not particularly restricted and can be appropriately selected from heretofore known materials. Preferable examples thereof include a manganese-strontium (Mn—Sr) material of 50 emu/g to 90 emu/g and a manganese-magnesium (Mn—Mg) material. A highly-magnetizing material such as iron powder of 100 emu/g or more and magnetite of 75 emu/g to 120 emu/g is preferable in terms of assuring the image density. A weakly-magnetized material such as copper-zinc (Cu—Zn) material of 30 emu/g to 80 emu/g is preferable since it softens the contact with a photoconductor on which the toner has developed a magnetic brush and is advantageous in terms of high image quality. These may be used alone or in combination of two or more types.

The particle diameter of the core is, on an average particle diameter or a volume-average particle diameter $D_{50}$, preferably 10 μM to 200 μm, and more preferably 40 μm to 100 μm.

When the average particle diameter or the volume-average particle diameter $D_{50}$ is less than 10 μm, the ratio of fine powder increases in the distribution of the carrier particles, and carrier dispersal may occur due to the decrease in the degree of magnetization per one particle. When it exceeds 200 μm, the specific surface area decreases to cause toner dispersal. In a full-color printing with many solid portions, especially the reproduction of the solid portions may degrade.

The material for the resin layer is not restricted and can be selected appropriately from heretofore known resins according to applications. Examples thereof include amino resins, polyvinyl resins, polystyrene resins, halogenated olefin resins, polyester resins, polycarbonate resins, polyethylene resins, polyvinyl fluoride resins, polyvinylidene fluoride resins, polytrifluoroethylene resins, polyhexafluoropropylene resins, copolymers of vinylidene fluoride and an acrylic monomer, copolymers of vinylidene fluoride and vinylidene fluoride, fluoroterpolymers such as terpolymer of tetrafluoroethylene, vinylidene fluoride and nonfluorinated monomer and silicone resins. These may be used alone or in combination of two or more.

Examples of the amino resins include a urea-formaldehyde resin, a melamine resin, a benzoguanamine resin, a urea resin, a polyamide resin and an epoxy resin. Examples of the polyvinyl resins include an acrylic resin, a polymethylmethacrylate resin, a polyacrylonitrile resin, a polyvinyl acetate resin, a polyvinyl alcohol resin and a polyvinyl butyral resin. Examples of the polystyrene resins include a polystyrene resin and a styrene-acrylic copolymer resin. Examples of the halogenated olefin resins include a polyvinyl chloride. Examples of the polyester resins include a polyethylene terephthalate resin and polybutylene terephthalate resin.

The resin layer may optionally include a conductive powder according to requirements, and examples of the conductive powder include metal powder, carbon black, titanium oxide, tin oxide and zinc oxide. The average particle diameter of these conductive powders is preferably 1 μm or less. When the average particle diameter exceeds 1 μm, it may be difficult to control the electric resistance.

The resin layer may be formed, for example, by the following steps. First, a coating solution is prepared by dissolving a resin such as the silicone resin in a solvent. Then, the coating solution is uniformly applied and dried on the surface of the core by means of a heretofore coating method followed by baking. Examples of the coating method include the dipping method, the spray method and the brush coating method.

The solvent is not particularly restricted and can be appropriately selected according to applications. Examples thereof include toluene, xylene, methyl ethyl ketone, methyl isobutyl ketone, cellosolve and butyl acetate.

The baking is not particularly restricted, and it can be external heating or internal heating. Examples thereof include a method with a fixed electric furnace, a fluid electric furnace, a rotary electric furnace and a burner furnace and a method with a microwave.

The quantity of the carrier in the resin layer is preferably 0.01% by mass to 5.0% by mass.

When the quantity is less than 0.01% by mass, there are occasions that the resin may not be formed uniformly on the surface of the core. The quantity exceeding 5.0% by mass excessively thickens the resin layer, causing the granulation among carrier particles, and therefore, uniform carrier particles may not be obtained.

When the developer is the two-component developer, the content of the carrier in the two-component developer is not particularly restricted and can be appropriately selected according to applications. For example, it is preferably 90% by mass to 98% by mass, and more preferably 93% by mass to 97% by mass.

The mixing ratio of the toner of the two-component developer to the carrier is, in general one part by mass to 10.0 parts by mass of the toner to 100 parts of the carrier.

Since the developer of the present invention includes the toner of the present invention, filming on the photoconductor may be prevented. Therefore, a high-quality, sharp and superior image without variation in the image unevenness may be formed.

The developer of the present invention may be favorably applied to an image formation by means of heretofore known various electrophotographic methods such as magnetic one-component development method, non-magnetic one-component development method and two-component development method, and it may be particularly favorably applied to a toner container, a process cartridge, an image forming apparatus and an image forming method of the present invention described hereinafter.

(Toner Container)

A toner container of the present invention contains inside the toner or the developer of the present invention.

The toner or the developer of the present invention is filled and stored in a container which has been commonly used such as container in which an agitator is installed, plastic container whose wall has a spiral structure and a cartridge-type container. A container itself in which a toner has been stored is provided to a user separately from an image forming apparatus body. Furthermore, a retaining system to refill the toner container a user has at hand has been considered recently.

The container is not particularly restricted and can be appropriately selected from heretofore known containers. A container having a toner container body and a cap is given as a preferable example.

Regarding the toner container body, the size, shape, structure and material are not particularly restricted and can be appropriately selected according to applications. For example, the shape is preferably cylindrical. It is particularly preferable that the inner peripheral surface is patterned so that the toner as the content is transferred to the outlet by rotating the container and that a part of or the whole spiral has a bellows function.

The material of the toner container body is not particularly restricted, and those with dimensional accuracy are preferable. For example, resins are favorable. Among these resins, favorable examples include a polyester resin, a polyethylene resin, a polypropylene resin, a polystyrene resin, a polyvinyl chloride resin, a polyacrylic resin, a polycarbonate resin, an ABS resin and a polyacetal resin.

The toner container of the present invention provides simplicity in storage and transfer as well as superior handle ability. It may be suitably used for toner supply by detachably attaching it to a process cartridge and an image forming apparatus of the present invention described hereinafter.

(Process Cartridge)

A process cartridge of the present invention includes at least a latent electrostatic image bearing member which bears a latent electrostatic image and a developing means which forms a visible image by developing with the developer the latent electrostatic image borne on the latent electrostatic image bearing member, and it further includes other means such as charging unit, exposing unit, transferring means, cleaning means and discharging means appropriately selected according to requirements.

The developing means includes at least a developer container that contains the toner or the developer of the present invention and a developer bearing member which bears and transfers the toner or the developer contained in the developer container, and it may further include, for example, a thickness regulation member for regulating the thickness of the toner layer that the member bears.

The process cartridge of the present invention may be detachably provided on various electrophotographic apparatuses, facsimiles and printers, and preferably, it is detachably provided on an image forming apparatus of the present invention described hereinafter.

Figure 18:
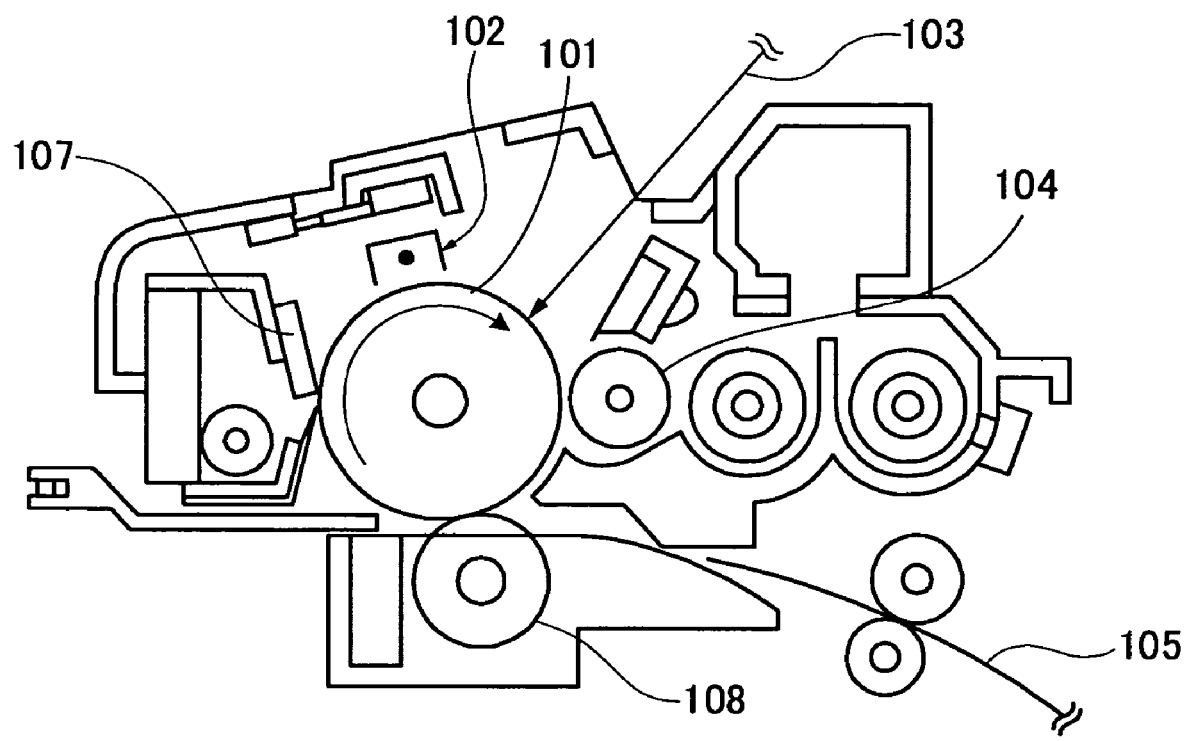
FIG. 18 is a schematic diagram showing an example of a process cartridge of the present invention.

The process cartridge, for example as shown in FIG. 18, houses a photoconductor 101. It also includes a charging unit 102, a developing means 104, a transferring means 108 and a cleaning means 107, and it further includes other members according to requirements. In FIG. 18, the codes 103 and 105 indicate an exposure light by an exposing unit and a recording medium, respectively.

As the photoconductor 101, an apparatus similar to an image forming apparatus described hereinafter may be used. Any charging member is used as the charging unit 102.

Next, an image forming process by means of the process cartridge shown in FIG. 18 is illustrated. A latent electrostatic image corresponding to an exposure image is formed on the surface of the photoconductor 101, which is rotating in the direction of the arrow, by the charge from the charging means 102 and exposure 103 from an exposing means (not shown). This latent electrostatic image is toner developed in the developing means 104, and the toner development is transferred to the recording medium 105 by the transferring means 108. Next, the photoconductor surface after the image transfer is cleaned with the cleaning means 107 and further discharged by a discharging means (not shown) The above operations are repeated again.

Regarding the image forming apparatus of the present invention, components such as latent electrostatic image bearing member, developing unit and cleaning unit are integrated to form a process cartridge, and this unit may be detachably attached to the apparatus body. Also, at least any one of the charging unit, the image exposing unit, the developing unit, the transferring or separating unit and the cleaning unit is supported with the latent electrostatic image bearing member to form the process cartridge as a single unit which can be detachably attached to the apparatus body, and the unit may have a detachable configuration by a guiding means such as rail on the apparatus body.

(Image Forming Apparatus and Image Forming Method)

An image forming apparatus of the present invention contains a latent electrostatic image bearing member, a latent electrostatic image forming means, a developing means, a transferring means and a fixing means, and it further contains other means appropriately selected according to requirements such as discharging means, cleaning means, recycling means and controlling means.

An image forming method of the present invention contains a latent electrostatic image forming process, a developing process, a transferring process and a fixing process, and it further contains other processes appropriately selected according to requirements such as discharging process, cleaning process, recycling process and controlling process.

The image forming method of the present invention may be favorably performed by means of the image forming apparatus of the present invention. The latent electrostatic image forming process may be performed by the latent electrostatic image forming means, the developing process may be performed by the developing means, the transferring process may be performed by the transferring means, the fixing process may be performed by the fixing means, and the other process may be performed by the other means.

-Latent Electrostatic Image Forming Process and Latent Electrostatic Image Forming Means- The latent electrostatic image forming process is a process to form a latent electrostatic image on the latent electrostatic image bearing member.

The latent electrostatic image bearing member, which may also be referred to as an electrophotographic conductor or a photoconductor, is not restricted in terms of the material, shape, structure and size, and it can be appropriately selected from heretofore known photoconductors. The shape of a drum is favorable. Examples of the material include an inorganic photoconductor such as amorphous silicon and selenium and an organic photoconductor such as polysilane and phthalopolymethine. Among these, amorphous silicon is preferable in terms of long lifetime.

As the amorphous silicon photoconductor, for example, it is possible to use a photoconductor having a photoconductive layer with a-Si deposited by means of a film formation method such as vapor deposition method, sputtering method, ion plating method, thermal-CVD method, photo-CVD method and plasma-CVD method on a substrate which has been previously heated to 50° C. to 400° C., which may also be referred to an a-Si photoconductor. Among these methods, the plasma-CVD method is favorable, where an a-Si deposition layer is formed on a substrate by decomposing a source gas with DC, or high-frequency or microwave glow discharge.

The latent electrostatic image may be formed, for example, by charging uniformly the surface of the latent electrostatic image bearing member followed by imagewise exposure, which may be performed by the latent electrostatic image forming means.

The latent electrostatic image forming means houses at least a charging unit that uniformly charges the surface of the latent electrostatic image bearing member and an exposing unit that performs an imagewise exposure.

The charging may be performed, for example, by applying an electric potential on the surface of the latent electrostatic image bearing member with the charging unit.

The charging unit is not particularly restricted and can be appropriately selected according to applications. Examples thereof include a contact charging unit, which itself is heretofore known, having a conductive or semiconductive roll, a brush, a film or a rubber blade; and a noncontact charging unit utilizing corona discharge such as corotron and scorotron.

The configuration of the charging unit may be in the form of, other than a roller, a magnetic brush and a fur brush, and it may be selected according to the specification and the configuration of the electro photographic apparatus. The magnetic brush is configured with: various types of ferrite particles such as Zn—Cu ferrite used as a charging member; a nonmagnetic conductive sleeve for supporting the charging member; and a magnet roller included in the sleeve. Regarding the fur brush, a conduction-processed fur with carbon, copper sulfate, metal or metal oxide for conductivity is used as a material for the fur brush, and a charging unit is formed by wrapping or pasting the fur on a metal shaft or a conduction-processed shaft.

The charging unit is not restricted to the contact charging units above, but the use of a contact charging unit is preferable since an image forming apparatus may be obtained with which the generation of the ozone from the charging unit is suppressed.

The exposure may be performed, for example, by exposing imagewise the surface of the latent electrostatic image bearing member with the exposing unit.

The exposing unit is not particularly restricted as long as it can perform an imagewise exposure as intended on the surface of the latent electrostatic image bearing member charged by the charging unit, and it can be appropriately selected according to applications. Examples of the exposing unit include a copying optical system, a rod lens array system, a laser optical system and liquid crystal shutter optical system.

In the present invention, the back-exposure method may be adopted in which an exposure is performed imagewise from the back side of the latent electrostatic image bearing member.

-Developing Process and Developing Means-

The developing process is a process to develop the latent electrostatic image using the toner or the developer of the present invention to form a visible image.

The formation of the visible image may be performed by developing the latent electrostatic image using the toner or the developer of the present invention, and it may be performed by the developing means.

The developing means is not particularly restricted as long as it can perform a development using the toner or the developer of the present invention, and it can be appropriately selected from heretofore known developing means. For example, a preferable developing means contains the toner or the developer of the present invention and includes a developing unit which can impart the toner or the developer in a contact or noncontact manner to the latent electrostatic image. A developing unit which provides the toner container of the present invention is more preferable.

The developing unit may be of a dry development or a wet development. It may also be a monochrome developing unit or a multi-color developing unit. For example, a developer having an agitator that frictions and agitates the toner or the developer of the present invention for electrification and a rotatable magnet roller is preferable.

In the developing unit, for example, the toner and the carrier are mixed and agitated, which causes a friction to charge the toner and maintains the charged toner on the surface of the rotating magnet roller in a state of a chain of magnetic particles, and a magnetic brush is formed. The magnet roller is arranged near the latent electrostatic image bearing member, i.e. photoconductor; therefore, a part of the toner constituting the magnetic brush formed on the surface of the magnetic roller transfers to the surface of the latent electrostatic image bearing member, i.e. photoconductor, due to electric attraction. As a result, the latent electrostatic image is developed by the toner, and a visible image by the toner is formed on the surface of the latent electrostatic image bearing member, i.e. photoconductor.

The developer contained in the developing unit is the developer of the present invention including the toner, and it may be the one-component developer or the two-component developer. The toner included in the developer is the toner of the present invention.

-Transferring Process and Transferring Means-

The transferring process is a process to transfer the visible image to a recording medium. The transferring process preferably has an aspect that with an intermediate transferring member, it performs a primary transfer to transfer the visible image to the intermediate transferring member followed by a secondary transfer to transfer the visible image to the recording medium. An aspect which includes a primary transferring process that transfers the visible image to the intermediate transferring member to form a complex transfer image and a secondary transferring process that transfers the complex transfer image to the recording medium using a toner having two or more colors or preferably a full-color toner is more preferable.

The transfer of the visible image may be performed by charging the latent electrostatic image bearing member, i.e. photoconductor, using a transfer charging unit, and it may be performed by the transferring means. The transferring means preferably has an aspect that includes a primary transferring means that transfers a visible image to an intermediate transferring member to form a complex transfer image and a secondary transferring means that transfers the complex transfer image to a recording medium.

The intermediate transferring member is not particularly restricted and can be appropriately selected according to applications from heretofore known transferring member. Favorable examples include a transfer belt.

The transferring means, i.e. the primary transferring means and the secondary transferring means, preferably contain at least a transferring unit that strips and charges the visible image formed on the latent electrostatic image bearing member, i.e. photoconductor, to the side of the recording medium. There may be one transferring means, or there may be two or more.

Examples of the transferring unit include a corona transferring unit by corona discharge, a transfer belt, a transfer roller, a pressure transfer roller and an adhesive transferring unit.

Also, the typical recording medium is plain paper, but it is not particularly restricted as long as an unfixed image after developing can be transferred. It can be appropriately selected according to applications, and a PET base for OHP may be used.

-Fixing Process and Fixing Means-

The fixing process is a process to fix the visible image transferred to the recording medium by means of a fixing apparatus. It may be performed every time the toner of each color is transferred to the recording medium, or it may be performed at once when the toner of all the colors is laminated.

The fixing apparatus is not particularly restricted and can be selected appropriately according to applications. A heretofore known hot-pressing means is favorable. Examples of the hot-pressing means include a combination of a heat roller and a pressure roller and a combination of a heat roller, a pressure roller and an endless belt.

In general the heating in the hot-pressing means is preferably 80° C. to 200° C.

In the present invention, a heretofore known optical fixing unit, for example, may be used along with or in place of the fixing process and the fixing means according to applications.

The discharging process is a process to discharge the latent electrostatic image bearing member by applying a discharging bias, and it may be favorably performed by a discharging means.

The discharging means is not particularly restricted as long as the discharging bias is applied to the latent electrostatic image bearing member. It can be appropriately selected from heretofore known discharging units, and favorable examples include a discharge lamp.

The cleaning process is a process to remove the residual toner on the latent electrostatic image bearing member, and it may be favorably performed by a cleaning means.

The cleaning means is not particularly restricted as long as it can remove the electrophotographic toner remaining on the latent electrostatic image bearing member, and it can be appropriately selected from heretofore known cleaners. Favorable examples thereof include a magnetic brush cleaner, a static brush cleaner, a magnetic roller cleaner, a blade cleaner, a brush cleaner and a web cleaner.

The recycling process is a process to recycle the electrophotographic toner removed in the cleaning process to the developing means, and it may be favorably performed by a recycling means.

The recycling means is not particularly restricted, and a heretofore known transporting means may be used.

The controlling process is a process to control each of the above-mentioned processes, and it may be favorably performed by a controlling means.

The controlling means is not particularly restricted as long as it can control the behavior of each of the means. Examples thereof include equipment such as sequencer and computer.

An aspect that implements the image forming method of the present invention by the image forming apparatus of the present invention is illustrated with reference to FIG. 19. An image forming apparatus 100 shown in FIG. 19 provides: a photoconductor drum 10 as the latent electrostatic image bearing member (hereinafter referred to as a photoconductor 10), a charge roller 20 as the charge unit, an exposure apparatus 30 as the exposing unit, a developing apparatus 40 as the developing means, an intermediate transferring member 50, a cleaning apparatus 60 as the cleaning means having a cleaning blade and a discharge lamp 70 as the discharging mean.

The intermediate transferring member 50 is an endless belt, and it is designed to be movable in the direction of the arrow by means of three rollers 51, which are arranged inside and spanning the belt. A part of the rollers 51 also functions as a transfer bias roller which can apply a predefined transfer bias (primary transfer bias) to the intermediate transferring member 50. The intermediate transferring member 50 has a cleaning apparatus 90 with a cleaning blade arranged in its vicinity and a transfer roller 80 as the transferring means which can apply a transfer bias for the transfer (secondary transfer) of a developing image (toner image) to transfer paper 95 as a final transfer member arranged in the opposite position. Around the intermediate transferring member 50, a corona charging unit 58 for charging the toner image on the intermediate transferring member 50 is placed in the rotating direction of the intermediate transferring member 50 between the contact point of the photoconductor 10 and the intermediate transferring member 50 and the contact point of the intermediate transferring member 50 and the transfer paper 95.

The developing apparatus 40 is composed of a developing belt 41 as the developer bearing member as well as a black developing unit 45K, a yellow developing unit 45Y, a magenta developing unit 45M and a cyan developing unit 45C arranged in parallel along the developing belt 41. Here, the black developing unit 45K contains a developer containing part 42K, a developer supply roller 43K and a developer roller 44K. The yellow developing unit 45Y contains a developer containing part 42Y, a developer supply roller 43Y and a developer roller 44Y The magenta developing unit 45M contains a developer containing part 42M, a developer supply roller 43M and a developer roller 44M. The cyan developing unit 45C contains a developer containing part 42C, a developer supply roller 43C and a developer roller 44C. Also, the developing belt 41 is an endless belt, spanned rotatably over multiple belt rollers, and a part thereof is in contact with the photoconductor 10.

Figure 19:
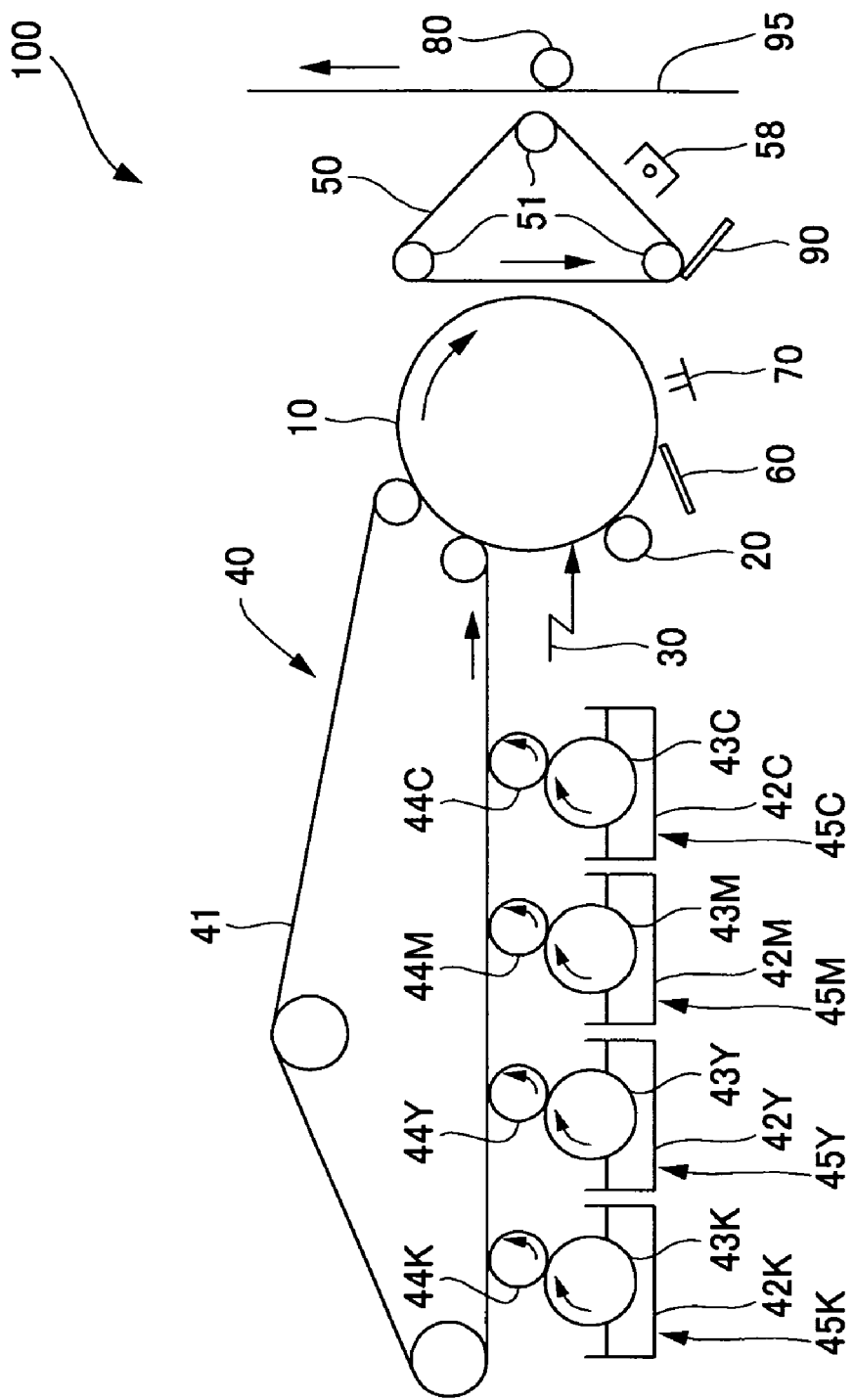
FIG. 19 is a schematic diagram showing an example of an image forming apparatus of the present invention.

In the image forming apparatus 100 shown in FIG. 19, for example, the charge roller 20 uniformly charges the photoconductor drum 10. The exposure apparatus 30 exposes imagewise to form a latent electrostatic image on the photoconductor drum 10. The toner is provided from the developing apparatus 40 to develop and form a visible image (toner image). The visible image (toner image) is transferred on the intermediate transferring member 50 by an electric voltage applied by the roller 51 (primary transfer), and it is further transferred on the transfer paper 95 (secondary transfer). As a result, a transfer image is formed on the transfer paper 95. Here, the residual toner on the photoconductor 10 is removed by the cleaning apparatus 60, and the charge over the photoconductor 10 is once discharged by the discharge lamp 70.

Figure 20:
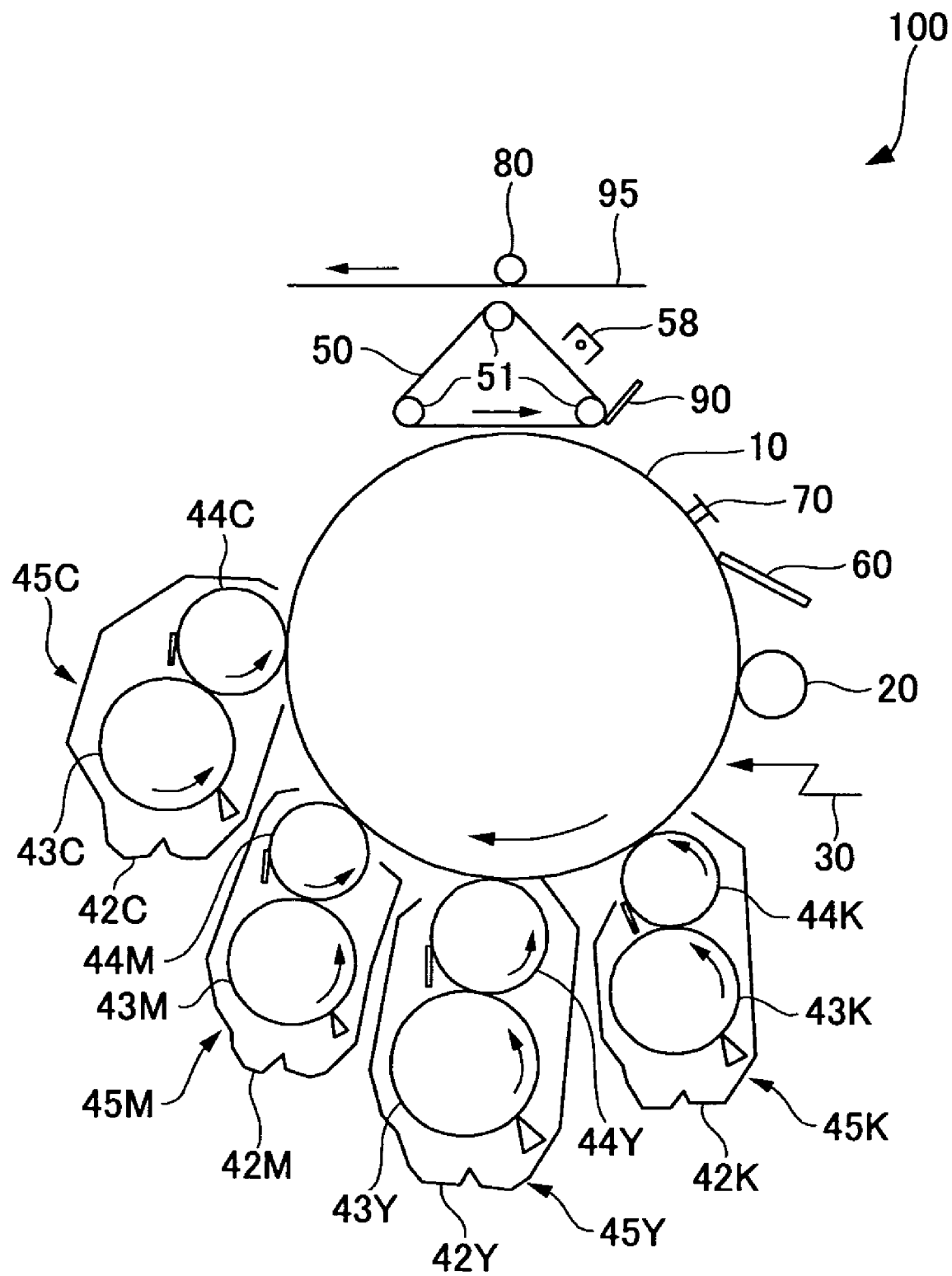
FIG. 20 is a schematic diagram showing another example of an image forming apparatus of the present invention.

Another aspect to implement the image forming method of the present invention by means of the image forming apparatus of the present invention is illustrated with reference to FIG. 20. An image forming apparatus 100 shown in FIG. 20 has a similar configuration as the image forming apparatus 100 shown in FIG. 19 except that the developing belt 41 in the image forming apparatus 100 in FIG. 19 is not provided and that the black developing unit 45K, the yellow developing unit 45Y, magenta developing unit 45M and the cyan developing unit 45C are arranged directly in the opposite side of a photoconductor 10, and it shows similar working effects. Here, the members in FIG. 20 equivalent to those in FIG. 19 are indicated with the same codes.

Figure 21:
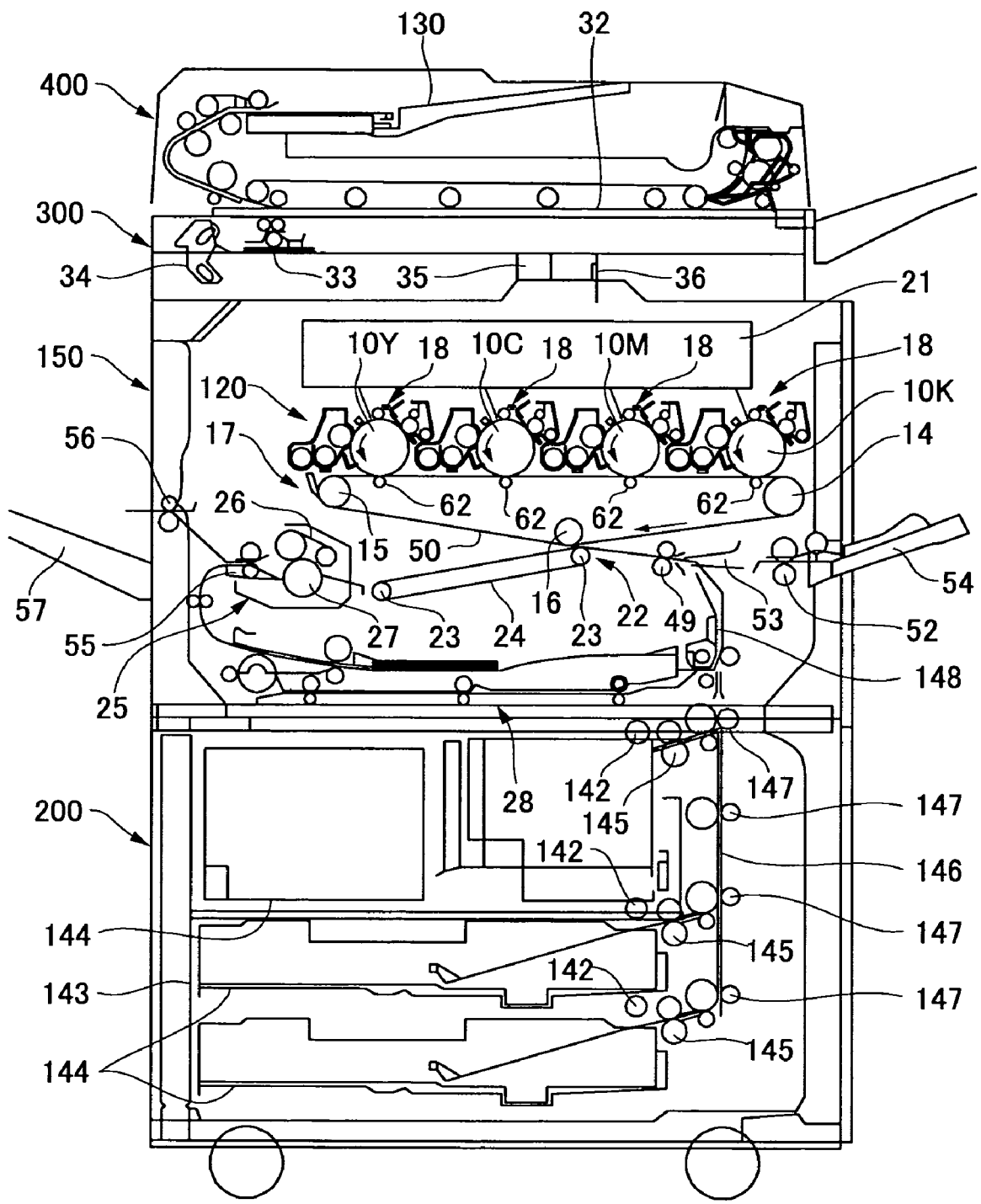
FIG. 21 is a schematic diagram showing an example of a tandem image forming apparatus of the present invention.

Another aspect to implement the image forming method of the present invention by means of the image forming apparatus of the present invention is illustrated with reference to FIG. 21. A tandem image forming apparatus shown in FIG. 21 is a tandem color-image forming apparatus. The tandem image forming apparatus has a copying apparatus body 150, a paper feed table 200, a scanner 300 and an automatic document feeder (ADF) 400.

In the copying apparatus body 150, an intermediate transferring member 50 is located as an endless belt at the center. The intermediate transfer member 50 is spanned over support rollers 14, 15 and 16 and rotatable clockwise in FIG. 21. Near the support roller 15, an intermediate transferring member cleaning apparatus 17 is placed to remove the residual toner on the intermediate transferring member 50. On the intermediate transferring member 50 spanned by the support roller 14 and the support roller 15, a tandem developing unit 120 is placed, opposite to which four image forming means 18 of yellow, cyan, magenta and black are arranged in parallel along the transporting direction. Near the tandem developing unit 120, an exposure apparatus 21 is placed. On the side of the intermediate transferring member 50 opposite to the side of the tandem developing unit 120, a secondary transferring apparatus 22 is placed. In the secondary transferring apparatus, a secondary transfer belt 24 as an endless belt is spanned over a pair of rollers 23, and transfer paper transported on the secondary transfer belt 24 and the intermediate transferring member 50 can contact with each other. Near the secondary transferring apparatus 22, a fixing apparatus 25 is placed. The fixing apparatus 25 has a fixing belt 26 as an endless belt and a pressure roller 27 arranged such that it is being pressed thereby.

Here, near the secondary transfer apparatus 22 and the fixing apparatus 25 of the tandem image forming apparatus, a sheet reversing apparatus 28 is placed to reverse transfer paper so that images are formed on both sides of the transfer paper.

Next, the formation of a full-color image, i.e. color copy, by means of the tandem image forming apparatus is illustrated. That is, first of all, an original document is placed on a document table 130 of the automatic document feeder (ADF) 400, or the original document is placed on a contact glass 32 of the scanner 300 by opening the automatic document feeder 400, which is then closed.

A start key (not shown) is pressed, and the scanner 300 is activated to drive a first carriage 33 and a second carriage 34 after the document is fed and transported onto the contact glass 32 when the original document has been placed on the automatic document feeder 400, or on the other hand immediately when the original copy is placed on the contact glass 300. At this time, the light from the light source is irradiated by the first carriage 33 as well as the light reflected from the document surface is reflected by a mirror in the second carriage 34, which is received by a reading sensor 36 through a lens 35. As a result, a color document (color image) is read as black, yellow, magenta and cyan image information.

Figure 22:
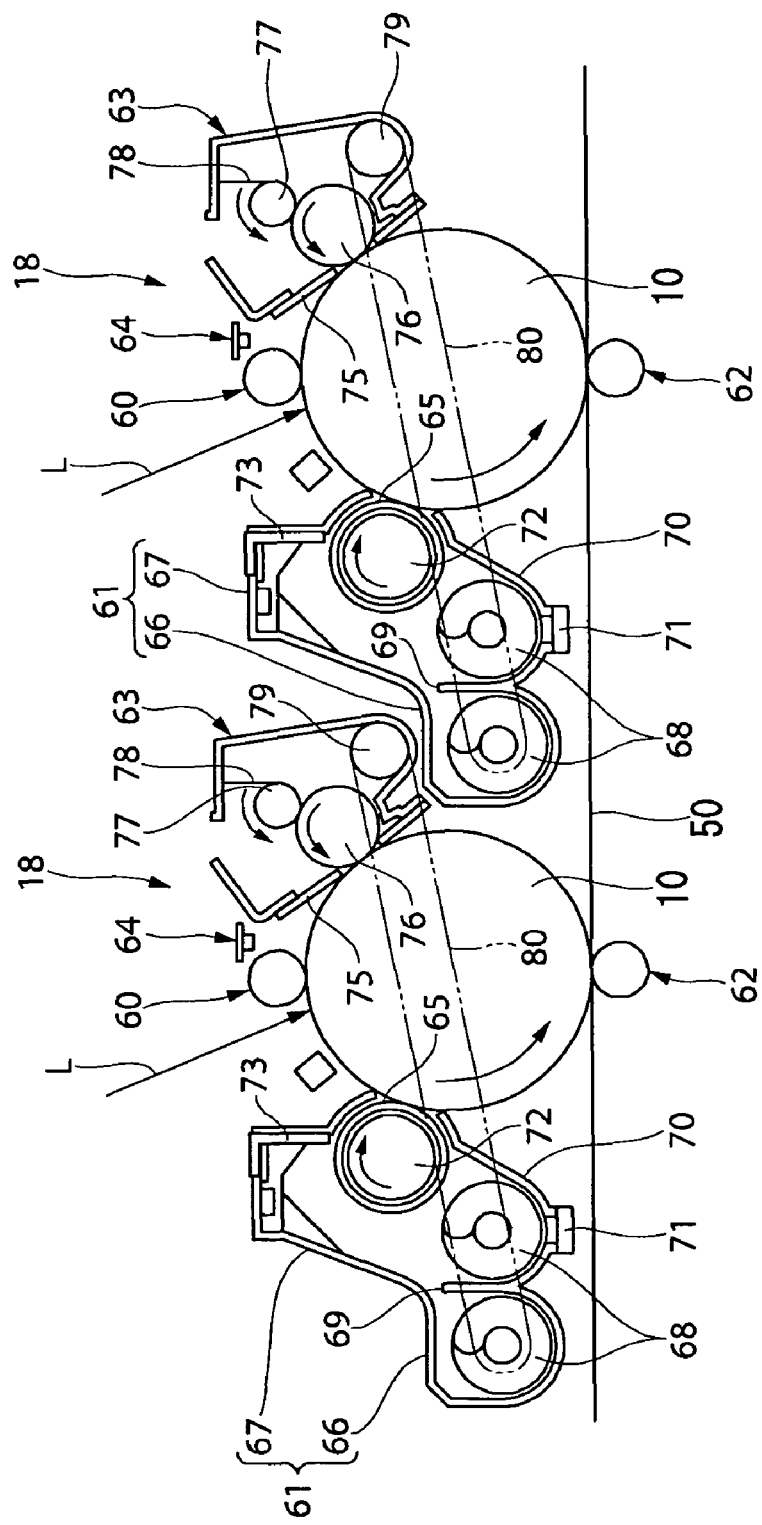
FIG. 22 is a partially-enlarged schematic diagram of FIG. 21.

Each of the black, yellow, magenta and cyan image information is transmitted to each image forming means 18 (black image forming means, yellow image forming means, magenta image forming means and cyan image forming means), and black, yellow, magenta and cyan toner images are formed in the respective image forming means. That is, as illustrated in FIG. 22, each image forming means 18 (black image forming means, yellow image forming means, magenta image forming means and cyan image forming means) in the tandem image forming apparatus has: a photoconductor 10 (black photoconductor 10K, yellow photoconductor 10Y, magenta photoconductor 10M and cyan photoconductor 10C); a charging unit 60 that umiformly charges the respective photoconductor; an exposing unit that exposes imagewise the photoconductor (L in FIG. 22) corresponding to the respective color image based on the color image information and forms a latent electrostatic image of the respective color image on the photoconductor; a developing unit 61 that develops the latent electrostatic image using the respective color toner (black toner, yellow toner, magenta toner and cyan toner) and forms a toner image of the respective color toner; a transfer charging unit 62 for transferring the toner image on the image transferring member 50; a photoconductor cleaning apparatus 63; and a discharging unit 64. Therefore, based on the image information of the respective color, an image of a single color (black image, yellow image, magenta image and cyan image) may be formed. The black image formed on the black photoconductor 10K, the yellow image formed on the yellow photoconductor 10Y, the magenta image formed on the magenta photoconductor 10M and the cyan image formed on the cyan photoconductor 10C as above are sequentially transferred on the intermediate transferring member 50, which is rotationally shifted by means of the support rollers 14, 15 and 16 (primary transfer). Then, a composite color image (color transfer image) is formed by superimposing the black image, the yellow image, the magenta image and the cyan image on the intermediate transferring member 50.

On the other hand, on the paper feed table 200, one of the feed rollers 142 is selectively rotated to let out a sheet of recording paper from one of the multi-stage paper feeding cassettes 144 provided in a paper bank 143. The sheet is separated one by one and delivered to the paper feeding path 146 by separation rollers 145. It is then transported and guided by conveyance rollers 147 to a paper-feeding path 148 in the copying machine body 150 and finally stopped by striking to a paper stop roller 49. Here, the paper stop roller 49 is generally used grounded, but it may be used in the state a bias is applied for paper powder removal. Then, the paper stop roller 49 is rotated with precise timing with the composite color image (color transfer image) combined on the intermediate transferring member 50 to feed the sheet (recording paper) between the intermediate transferring member 50 and the secondary transferring apparatus 22, and by transferring the composite color image (color transfer image) on the sheet (recording paper) by means of the secondary transferring apparatus 22 (secondary transfer), a color image is transferred and formed on the sheet (recording paper). Here, the residual toner on the intermediate transferring member 50 after the image transfer is removed by means of the intermediate transferring member cleaning apparatus 17.

The sheet (recording paper) on which a color image is transferred and formed is transported and delivered by the secondary transferring apparatus 22 to the fixing apparatus 25, and in the fixing apparatus 25, the composite color image (color transfer image) is fixed on the sheet recording paper) under heat and pressure. Then, the sheet recording paper) is switched by a switching claw 55, discharged by a delivery roller 56 and stacked on a copy receiving tray 57. Alternatively, the sheet (recording paper) switched by the switching claw 55 is reversed by the sheet reversing apparatus 28 and guided again to the transferring position for recording an image on the back side. It is then discharged by the delivery roller 56 and stacked on the copy receiving tray 57.

The present invention is illustrated in detail with reference to examples and comparative examples given below, but these are not to be construed as limiting the present invention but to facilitate understanding of the present invention.

In Examples and Comparative Examples below, a mass average particle diameter, the ratio of a mass average particle diameter to a number average particle diameter, an average sphericity, the content of fine powder having a particle diameter of 2 μm or less and a noise are measured as follows.

<Mass Average Particle Diameter and Particle Size Distribution>

The mass average particle diameter and the particle size distribution of a toner for developing a latent electrostatic image were measured with COULTER COUNTER Multisizer, manufactured by Beckman Coulter, Inc., with an aperture diameter of 100 μm. These results were used for calculating the ratio of a mass average particle diameter to a number average particle diameter.

<Average Sphericity>

The average sphericity was measured with a flow particle image analyzer FPIA-2100, manufactured by Toa Medical Electronics Co., Ltd. More specifically, 0.1 mL to 0.5 mL of a surfactant (alkylbenzenesulfonate) was introduced in a container as a dispersant to 100 mL to 150 mL of water from which impurities had been removed in advance, and 0.1 g to 0.5 g of each toner was further introduced and dispersed. The obtained dispersion underwent a dispersion process for one minute to three minutes in an ultrasonic dispersion unit manufactured by Honda Electronic Co., Ltd. The shape and the distribution of the toner for latent electrostatic image were measured while the concentration of the dispersion was assumed to be 3,000 μL$^{-1}$ to 10,000 μL$^{-1}$. These results were used for calculating the average sphericity.

<Content of Fine Powder having a Particle Diameter of 2 μm or Less>

The content of fine powder having a particle diameter of 2 μm or less was measured with a flow particle image analyzer FPIA-2100, manufactured by Toa Medical Electronics Co., Ltd. A measurement result was displayed as a scattergram, where the condition of particles in terms of the combination of the particle size distribution and the sphericity distribution was displayed as a two-dimensional graph, and the x-axis representing the particle diameter ranging from 0.6 μm to 400 μm was divided in 226 parts. This x-axis was optionally allowed to be configured such that the axis is divided into three regions of number distributions, namely small-sized particle fraction, medium-sized particle fraction and large-sized particle fraction. Therefore, by configuring the range of the small-sized particle fraction 2 μm or less, the content of the particles having a particle diameter of 0.6 μm to 2 μm was obtained.

<Noise>

The noise during spraying was measured by SOUND LEVEL METER SL-1350, manufactured by Custom Co., Ltd. As an evaluation method, the equivalent sound level in decibels was used as an evaluation based on JIS Z8731, methods for measurement of sound level, where the fluctuating sound level was transformed to a stationary sound level with an equivalent energy. In other words, the decibel value increases as the difference in sound pressures between the noise and the stationary sound.

EXAMPLE 1

In a mixer, 100 parts by mass of a polyol resin, 6.0 parts by mass of a quinacridone magenta pigment (C.I. Pigment Red 122) and two parts by mass of zinc salicylate as a charge controller were mixed, and the mixture was further melt-mixed in an extruder. To this melt-mixed substance having a melt viscosity of 120 Pa·s, 1.0% by mass of carbon dioxide in a supercritical state was injected using a spray granulation apparatus shown in FIG. 1, with which the ring of the co-flow air ring nozzles 9-1 was replaced by upper secondary air holes 3-B arranged on the chamber top lid 3-A on top of the chamber 3 shown in FIG. 3 or sidewall secondary air holes 3-C arranged on the sidewall of the chamber 3. Then, a spray granulation was performed with the melt viscosity decreased to 100 Pa·s. Here, the ratio of the secondary air flow rate Q1 introduced from the top of the chamber to the high-pressure gas flow rate for spray granulation had a relation: $Q1=2/5 \cdot Q$, and the ratio of the secondary air flow rate Q2 introduced from the side of the chamber to the high-pressure gas flow rate had a relation: $Q2=1/5 \cdot Q$. Finally, toner base particles having a mass average particle diameter of 5.5 μm, the ratio of the mass average particle diameter to number average particle diameter of 1.18 and an average sphericity of 0.97. Also, the granulation yield or the product yield with respect to the input melt-mixed substance was 90%. Also, the content of fine powder having a particle diameter of 2 μm or less was 8% by number.

Specific conditions were as follows:
Temperature of the melting unit: 70° C. to 130° C.
Number of the spray nozzles: 8 (four primary cross-collision nozzles and four secondary cross-collision nozzles)
Spray pressure: 0.5 MPa
Temperature of the compressed air: 150° C.
Internal temperature of the chamber: 30° C.
Secondary airflow introduced from the top of the chamber: $2/5 \cdot Q$ Secondary air from introduced from the sidewall of the chamber: $1/5 \cdot Q$

EXAMPLE 2

Toner base particles of Example 2 were obtained in the same manner as Example 1 except that the spray granulation apparatus in Example 1 was replaced by a spray granulation apparatus shown in FIG. 2 with which the ring of the co-flow air ring nozzle 9-1 was replaced by upper secondary air holes 3-B arranged on the chamber top lid 3-A on top of the chamber 3 shown in FIG. 3 or sidewall secondary air holes 3-C arranged on the sidewall of the chamber 3 and that 1.0% by mass of carbon dioxide in a supercritical state was injected for direct spray granulation. The obtained toner base particles had a mass average particle diameter of 5.6 μm, the ratio of the mass average particle diameter to number average particle diameter of 1.20 and an average sphericity of 0.96. The granulation yield or the product yield with respect to the input melt-mixed substance was 91%. Also, the content of fine powder having a particle diameter of 2 μm or less was 10% by number.

Specific conditions were as follows:
Temperature of the melting unit: 50° C. to 150° C.
Number of the spray nozzles: 8 (four primary cross-collision nozzles and four secondary cross-collision nozzles)
Spray pressure: 0.5 MPa
Temperature of the compressed air: 150° C.
Internal temperature of the chamber: 30° C.
Secondary airflow introduced from the top of the chamber: 1/5·Q
Secondary air from introduced from the sidewall of the chamber: 2/5·Q

EXAMPLE 3

Figure 10:
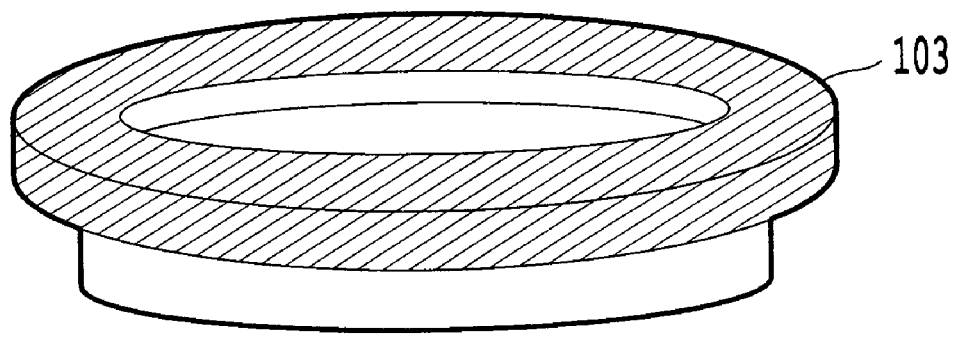
FIG. 10 is a diagram showing an example of a sound insulating material used for a chamber.
Figure 11:
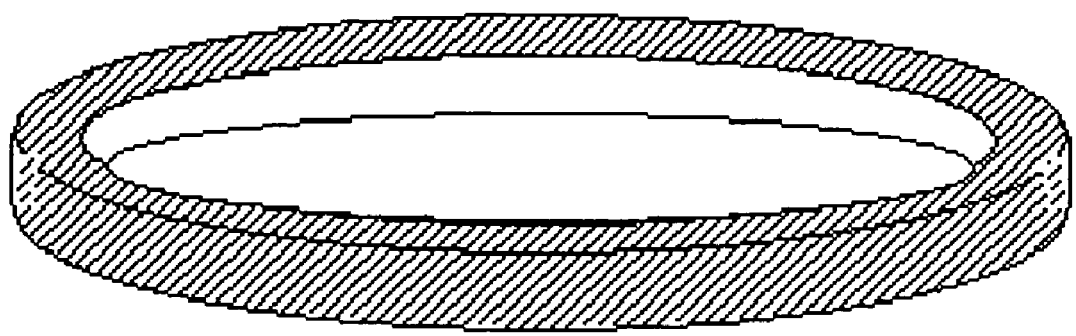
FIG. 11 is a diagram showing another example of a sound insulating material used for a chamber.

Toner base particles of Example 3 were obtained in the same manner as Example 2 except that the spray granulation apparatus shown in FIG. 2 was further equipped with a sound insulating material (made of NEOCALM, a platy sound absorbing material casted with an aluminum powder by sintering) shown in FIGS. 10 and 11 at the secondary air inlet holes on the top and the side of the chamber. The obtained toner base particles had a mass average particle diameter of 5.6 μm, the ratio of the mass average particle diameter to number average particle diameter of 1.20 and an average sphericity of 0.96. The granulation yield or the product yield with respect to the input melt-mixed substance was 91%. Also, the content of fine powder having a particle diameter of 2 μm or less was 10% by number. The noise during granulation was decreased from 85 dB to 80 dB compared to Examples 1 and 2.

EXAMPLE 4

Toner base particles of Example 4 were obtained in the same manner as Example 3 except that the spray granulation apparatus shown in FIG. 2 was further equipped with a sound insulating material (made of NEOCALM, a platy sound absorbing material casted with an aluminum powder by sintering) shown in FIG. 12, which covered the whole chamber. The obtained toner base particles had a mass average particle diameter of 5.6 μm, the ratio of the mass average particle diameter to number average particle diameter of 1.20 and an average sphericity of 0.96. The granulation yield or the product yield with respect to the input melt-mixed substance was 91%. Also, the content of fine powder having a particle diameter of 2 μm or less was 10% by number. The noise during granulation was decreased from 85 dB to 78 dB compared to Examples 1 and 2.

COMPARATIVE EXAMPLE 1

Toner base particles of Comparative Example 1 were obtained in the same manner as Example 1 except that the spray granulation apparatus of Example 1 was replaced by a spray granulation apparatus shown in FIG. 1, having a ring of co-flow air ring nozzle 9-1. The obtained toner base particles had a mass average particle diameter of 5.5 μm, the ratio of the mass average particle diameter to number average particle diameter of 1.17 and an average sphericity of 0.97. The granulation yield or the product yield with respect to the input melt-mixed substance was 75%. Also, the content of fine powder having a particle diameter of 2 μm or less was 8% by number. The noise during granulation was 85 dB.

Specific conditions were as follows:
Temperature of the melting unit: 70° C. to 130° C.
Number of the spray nozzles: 8 (four primary cross-collision nozzles and four secondary cross-collision nozzles)
Spray pressure: 0.5 MPa
Temperature of the compressed air: 150° C.
Internal temperature of the chamber: 30° C.
Flow rate of the sprayed co-flow air: 4/5·Q
Temperature of the co-flow air: 100° C.

COMPARATIVE EXAMPLE 2

Toner base particles of Comparative Example 2 were obtained with the same material as Example 1 and same conditions as Example 2 except that the spray granulation apparatus of Example 2 was replaced by a spray granulation apparatus shown in FIG. 2, having a ring of co-flow air ring nozzle 9-1. The obtained toner base particles had a mass average particle diameter of 5.5 μM, the ratio of the mass average particle diameter to number average particle diameter of 1.18 and an average sphericity of 0.97. The granulation yield or the product yield with respect to the input melt-mixed substance was 75%. Also, the content of fine powder having a particle diameter of 2 μm or less was 10% by number. The noise during granulation was 83 dB.

Specific conditions were as follows:
Temperature of the melting unit: 70° C. to 130° C.
Number of the spray nozzles: 8 (four primary cross-collision nozzles and four secondary cross-collision nozzles)
Spray pressure: 0.5 MPa
Temperature of the compressed air: 150° C.
Internal temperature of the chamber: 30° C.
Flow rate of the sprayed co-flow air: 4/5·Q
Temperature of the co-flow air: 100° C.

The results of Examples 1 to 4 and Comparative Examples 1 to 2 are summarized in Table 1.

TABLE 1

| | Productivity (kWh/kg) | Product Yield (%) | Noise (dB) |
|---|---|---|---|
| Example 1 | 5.3 | 90 | 85 |
| Example 2 | 5.2 | 91 | 85 |
| Example 3 | 5.4 | 91 | 80 |
| Example 4 | 5.4 | 91 | 78 |
| Comparative Example 1 | 7.2 | 75 | 85 |
| Comparative Example 2 | 7.3 | 75 | 83 |

The energy efficiency in the item Productivity represents the amount of power spent on 1 kg of a toner obtained with the indicated product yield.

Next, with respect to each toner obtained, an image was formed on copy paper (TYPE 6000 <70W> manufactured by Ricoh Company, Limited) using a tandem color electrophotographic apparatus (imagio Neo 450 manufactured by Ricoh Company, Limited), and the fog, resolution, image density and degree of granularity after printing 100 sheets and 50,000 sheets were evaluated as follows. The results are shown in Table 2.

<Fog>

The background was observed for smear by the toner and evaluated according to the ratings below:
A: Favorable with no smear
B: Fair with some smear
C: Poor with severe smear <Resolution>

A sheet of white paper as an original copy on which black lines had been drawn in parallel in a 1-mm width was photocopied, and the maximum number of distinguishable lines in the 1-mm width was determined.

<Image Density>

The reflection density of a solid portion of a photocopied image was measured with Macbeth densitometer.

<Degree of Granularity>

An image density was measured with a scanner, HEIDERBERG Nexscan F4100, and the degree of granularity was calculated according to the definitional equation by Dooley.

TABLE 2

| | | Image Quality | | | |
|---|---|---|---|---|---|
| | No. of sheets | Fog | Resolution | Image Density | Degree of Granularity |
| Example 1 | 100 | A | 7.0 | 1.50 | 0.39 |
| | 50,000 | A | 7.1 | 1.49 | 0.39 |
| Example 2 | 100 | A | 7.0 | 1.50 | 0.38 |
| | 50,000 | A | 6.9 | 1.49 | 0.39 |
| Example 3 | 100 | A | 7.0 | 1.50 | 0.40 |
| | 50,000 | A | 7.1 | 1.50 | 0.41 |
| Example 4 | 100 | A | 7.0 | 1.50 | 0.41 |
| | 50,000 | A | 7.1 | 1.51 | 0.42 |
| Comparative Example 1 | 100 | A | 6.8 | 1.49 | 0.37 |
| | 50,000 | A | 6.8 | 1.48 | 0.38 |
| Comparative Example 2 | 100 | A | 6.7 | 1.48 | 0.38 |
| | 50,000 | A | 6.8 | 1.49 | 0.38 |

A toner manufactured by the toner manufacturing method of the present invention enables the formation of an electrophotographic image having superior reproducibility of fine lines and tones which are equivalent to those of a silver halide image; therefore, it is favorably used for an image formation of high-quality electrophotography.

The developer, toner container, process cartridge, image forming apparatus and the image forming method of the present invention which employ the toner of the present invention are favorably used for high-quality image formation.

What is claimed is:

1. A method for manufacturing particles comprising the steps of:
    spraying a high-pressure gas over a viscous material while the viscous material is being discharged in a chamber; and
    introducing cooling air in the chamber for solidification, wherein
    the cooling air is introduced in the chamber through air inlets disposed on the chamber, wherein
    the air inlets are open to an atmosphere surrounding the chamber, the air inlets to the chamber are positioned on top of the chamber and on the sidewall of the chamber, and
    guide vanes are arranged to enable secondary air flow from the air inlets.

2. The method for manufacturing particles according to claim 1, wherein the viscous material is any one of a resin-melted material and a resin-dissolved material.

3. The method for manufacturing particles according to claim 1,
    wherein the viscous material is any one of a resin-melted material and a resin-dissolved material;
    any one of the resin-melted material and the resin-dissolved material is melt mixed under pressure, or any one of the resin-melted material and the resin-dissolved material is injected with a supercritical fluid and melt mixed; and
    the obtained melt-mixed substance is subsequently sprayed with a high-pressure gas for atomization while the melt-mixed substance is being discharged in the chamber.

4. The method for manufacturing particles according to claim 3,
    wherein at least one air inlet comprises a gate configured to adjust the cross-sectional area of the at least one air inlet.

5. The method for manufacturing particles according to claim 3,
    wherein the air inlets are covered with a sound insulating material.

6. The method for manufacturing particles according to claim 3,
    wherein the melt mixing is performed while the melt mixing apparatus in which a supercritical fluid is injected and dispersed has an internal temperature which is in any one of the range of −10° C. to +100° C. from the melting point or the initial efflux temperature of the viscous material and the range of +30° C. to +150° C. from the glass transition temperature of the viscous material.

7. The method for manufacturing particles according to claim 1,
    wherein the method for manufacturing particles comprises:
    a spray granulation apparatus comprising a means of melt mixing a viscous material under pressure, and
    the chamber comprising a high-pressure gas nozzle; and
    the viscous material is melt mixed, or the viscous material is injected with a supercritical fluid and melt mixed under pressure, and the obtained melt-mixed substance is subsequently sprayed with a high-pressure gas from the high-pressure gas nozzle for atomization while the melt-mixed substance is being discharged in the chamber.

8. The method for manufacturing particles according to claim 1, wherein the viscous material is a composite comprising a resin and particles.

9. The method for manufacturing particles according to claim 1,
    wherein the granulation is performed with the condition wherein the static pressure P inside the chamber satisfies the following relation: $-0.01 \text{ MPa} \leq P \leq 0.01 \text{ MPa}$.

10. The method for manufacturing particles according to claim 1,
    wherein the chamber comprises a jacket on the outer surface of the chamber which allows temperature regulation.

11. The method for manufacturing particles according to claim 1,
wherein the chamber comprises a heat insulating mechanism which is divided into multiple segments on the outer surface of the chamber.

12. The method for manufacturing particles according to claim 1,
wherein the chamber comprises a sound insulating mechanism on the outer surface of the chamber.

13. The method for manufacturing particles according to claim 1, wherein an ultrasonic pulse of 10 kHz to 80 kHz is imparted to the high-pressure gas.

14. The method for manufacturing particles according claim 1,
wherein the air inlets comprise a plurality of holes disposed on a chamber top lid on top of the chamber.

15. The method for manufacturing particles according to claim 1,
wherein the air inlets comprise a plurality of holes disposed on a sidewall of the chamber.

16. The method for manufacturing particles according to claim 1, wherein the guide vanes are disposed on a chamber top lid, which top lid is disposed on top of the chamber.

17. A method for manufacturing a toner comprising the steps of:
melt mixing any one mixture selected from (1) to (4) below under pressure or melt mixing any one mixture selected from (1) to (4) below with an injection of a supercritical fluid
(1) a mixture comprising a binding resin and a colorant;
(2) a mixture comprising a binding resin, a colorant and a charge controller;
(3) a mixture comprising a binding resin, a colorant, a charge controller and a wax; or
(4) a mixture comprising a binding resin, a magnetizing agent, a charge controller, a wax and a magnetizing agent;
spraying the obtained melt-mixed substance with a high-pressure gas for atomization while the melt-mixed substance is being discharged in a chamber; and
granulating by introducing cooling air in the chamber through air inlets disposed on the chamber, wherein
the air inlets are open to an atmosphere surrounding the chamber, the air inlets to the chamber are positioned on top of the chamber and on the sidewall of the chamber, and
guide vanes are arranged to enable secondary air flow from the air inlets.

18. The method for manufacturing a toner according to claim 17,
wherein at least one air inlet comprises a gate configured to adjust the cross-sectional area of the at least one air inlet.

19. The method for manufacturing a toner according to claim 17,
wherein the air inlets are covered with a sound insulating material.

20. The method for manufacturing a toner according to claim 17,
wherein the granulation is performed with the condition wherein the static pressure P inside the chamber satisfies the following relation: $-0.01 \text{ MPa} \leq P \leq 0.01 \text{ MPa}$.

21. The method for manufacturing a toner according to claim 17,
wherein the chamber comprises a jacket on the outer surface of the chamber which allows temperature regulation.

22. The method for manufacturing a toner according to claim 17,
wherein the chamber comprises a heat insulating mechanism which is divided into multiple segments on the outer surface of the chamber.

23. The method for manufacturing a toner according to claim 17,
wherein the chamber comprises a sound insulating mechanism on the outer surface of the chamber.

24. The method for manufacturing a toner according to claim 17,
wherein the melt mixing is performed while the melt mixing apparatus in which a supercritical fluid is injected and dispersed has an internal temperature which is in any one of the range of $-10°$ C. to $+100°$ C. from the melting point or the initial efflux temperature of the toner and the range of $+30°$ C. to $+150°$ C. from the glass transition temperature of the toner.

25. The method for manufacturing a toner according to claim 17,
wherein an ultrasonic pulse of 10 kHz to 80 kHz is imparted to the high-pressure gas.

26. The method for manufacturing a toner according to claim 17,
wherein the air inlets comprise a plurality of holes disposed on a chamber top lid on top of the chamber.

27. The method for manufacturing a toner according to claim 17,
wherein the air inlets comprise a plurality of holes disposed on a sidewall of the chamber.

28. A method for manufacturing a toner comprising a spray granulation apparatus,
wherein the spray granulation apparatus comprises a means of melt mixing any one of the mixtures selected from (1) to (4) below and a chamber comprising a high-pressure gas nozzle
(1) a mixture comprising a binding resin and a colorant;
(2) a mixture comprising a binding resin, a colorant and a charge controller;
(3) a mixture comprising a binding resin, a colorant, a charge controller and a wax; or
(4) a mixture comprising a binding resin, a magnetizing agent, a charge controller, a wax and a magnetizing agent,
wherein the mixture is uniformly dispersed while the mixture is melt mixed or the mixture is injected with an injection of a supercritical fluid and melt mixed under pressure;
the obtained dispersion is sprayed with a high-pressure gas for atomization while the dispersion is being discharged in the chamber; and
cooling air is introduced in the chamber through air inlets disposed on the chamber for granulation, wherein
the air inlets are open to an atmosphere surrounding the chamber, the air inlets to the chamber are positioned on top of the chamber and on the sidewall of the chamber, and
guide vanes are arranged to enable secondary air flow from the air inlets.

29. The method for manufacturing a toner according to claim 28,
wherein at least one air inlet comprises a gate configured to adjust the cross-sectional area of the at least one air inlet.

30. The method for manufacturing a toner according to claim 28,
wherein the air inlets are covered with a sound insulating material.

31. The method for manufacturing a toner according to claim 28,
wherein the granulation is performed with the condition wherein the static pressure P inside the chamber satisfies the following relation: $-0.01 \text{ MPa} \leq P \leq 0.01 \text{ MPa}$.

32. The method for manufacturing a toner according to claim 28,
wherein the chamber comprises a jacket on the outer surface of the chamber which allows temperature regulation.

33. The method for manufacturing a toner according to claim 28,
wherein the chamber comprises a heat insulating mechanism which is divided into multiple segments on the outer surface of the chamber.

34. The method for manufacturing a toner according to claim 28,
wherein the chamber comprises a sound insulating mechanism on the outer surface of the chamber.

35. The method for manufacturing a toner according to claim 28,
wherein the melt mixing is performed while the melt mixing apparatus in which a supercritical fluid is injected and dispersed has an internal temperature which is in any one of the range of $-10°$ C. to $+100°$ C. from the melting point or initial efflux temperature of the toner and the range of $+30°$ C. to $+150°$ C. from the glass transition temperature of the toner.

36. The method for manufacturing a toner according to claim 28,
wherein an ultrasonic pulse of 10 kHz to 80 kHz is imparted to the high-pressure gas.

37. The method for manufacturing a toner according to claim 28,
wherein the air inlets comprise a plurality of holes disposed on a chamber top lid on top of the chamber.

38. The method for manufacturing a toner according to claim 28,
wherein the air inlets comprise a plurality of holes disposed on a sidewall of the chamber.

* * * * *